(12) United States Patent
Zopf

(10) Patent No.: US 9,058,818 B2
(45) Date of Patent: Jun. 16, 2015

(54) USER ATTRIBUTE DERIVATION AND UPDATE FOR NETWORK/PEER ASSISTED SPEECH CODING

(75) Inventor: Robert W. Zopf, Rancho Santa Margarita, CA (US)

(73) Assignee: Broadcom Corporation, Irvine, CA (US)

( * ) Notice: Subject to any disclaimer, the term of this patent is extended or adjusted under 35 U.S.C. 154(b) by 647 days.

(21) Appl. No.: 12/887,329

(22) Filed: Sep. 21, 2010

(65) Prior Publication Data

US 2011/0099015 A1 Apr. 28, 2011

Related U.S. Application Data

(60) Provisional application No. 61/253,950, filed on Oct. 22, 2009.

(51) Int. Cl.
| | | |
|---|---|---|
| G10L 21/00 | (2013.01) | |
| G10L 19/16 | (2013.01) | |
| G10L 17/00 | (2013.01) | |
| G10L 19/00 | (2013.01) | |

(52) U.S. Cl.
CPC .............. *G10L 21/00* (2013.01); *G10L 19/0018* (2013.01); *G10L 19/16* (2013.01); *G10L 17/00* (2013.01)

(58) Field of Classification Search
CPC ....... G10L 15/22; G10L 15/265; G10L 17/26; G10L 13/043; G10L 15/063; G10L 17/005; G10L 19/008; G06F 3/16; H05K 999/99; H04W 8/245
USPC ......... 704/231, 250, 270, 200, 243, 273, 500, 704/504; 455/419
See application file for complete search history.

(56) References Cited

U.S. PATENT DOCUMENTS

| | | | |
|---|---|---|---|
| 4,910,781 A | 3/1990 | Ketchum et al. | |
| 5,359,696 A | 10/1994 | Gerson et al. | |
| 5,475,792 A | 12/1995 | Stanford et al. | |
| 5,774,856 A * | 6/1998 | Haber et al. ................... | 704/270 |
| 5,839,102 A | 11/1998 | Haagen et al. | |
| 6,044,265 A | 3/2000 | Roach | |
| 6,044,346 A | 3/2000 | Ali et al. | |
| 6,202,045 B1 | 3/2001 | Ojala et al. | |
| 6,351,494 B1 | 2/2002 | Kondo et al. | |
| 6,400,734 B1 | 6/2002 | Weigand | |
| 6,418,408 B1 | 7/2002 | Udaya Bhaskar | |
| 6,493,664 B1 | 12/2002 | Udaya Bhaskar et al. | |
| 6,546,515 B1 * | 4/2003 | Vary et al. ..................... | 714/746 |
| 6,691,092 B1 | 2/2004 | Udaya Bhaskar et al. | |
| 6,804,642 B1 | 10/2004 | Naylor | |
| 6,816,723 B1 | 11/2004 | Borland | |
| 6,832,189 B1 | 12/2004 | Kanevsky et al. | |
| 6,934,756 B2 | 8/2005 | Maes | |

(Continued)

*Primary Examiner* — Daniel Abebe
(74) *Attorney, Agent, or Firm* — Fiala & Weaver P.L.L.C.

(57) ABSTRACT

Systems, methods and apparatuses are described for deriving and updating user attribute information about users of a communications system. A communications network is then used to transfer the user attribute information to communication terminals, which use the user attribute information to configure a speech codec to operate in a speaker-dependent manner during a communication session, thereby improving speech coding efficiency. In a network-assisted model, the user attribute information is stored on the communications network and selectively transmitted to the communication terminals while in a peer-assisted model, the user attribute information is derived by and transferred between communication terminals.

44 Claims, 23 Drawing Sheets

(56) References Cited

U.S. PATENT DOCUMENTS

| | | |
|---|---|---|
| 7,089,178 B2 | 8/2006 | Garudadri et al. |
| 7,295,974 B1 | 11/2007 | Stachurski et al. |
| 7,310,596 B2 * | 12/2007 | Ota et al. ............... 704/201 |
| 7,373,298 B2 | 5/2008 | Ehara |
| 7,502,735 B2 | 3/2009 | Ehara |
| 7,529,675 B2 | 5/2009 | Maes |
| 8,086,460 B2 | 12/2011 | Da Palma et al. |
| 8,214,338 B1 | 7/2012 | Kirchhoff et al. |
| 8,255,207 B2 | 8/2012 | Vaillancourt et al. |
| 8,589,166 B2 | 11/2013 | Zopf |
| 8,818,817 B2 | 8/2014 | Zopf et al. |
| 2001/0051869 A1 | 12/2001 | Cho et al. |
| 2004/0033819 A1 * | 2/2004 | Hymel ...................... 455/567 |
| 2004/0119814 A1 | 6/2004 | Clisham et al. |
| 2004/0240675 A1 | 12/2004 | Casparian et al. |
| 2004/0243405 A1 | 12/2004 | Casparian et al. |
| 2005/0058208 A1 | 3/2005 | Ehara |
| 2005/0060143 A1 | 3/2005 | Ehara |
| 2005/0102257 A1 | 5/2005 | Onyon et al. |
| 2005/0276235 A1 | 12/2005 | Lee et al. |
| 2006/0041431 A1 * | 2/2006 | Maes ........................ 704/270.1 |
| 2006/0046671 A1 * | 3/2006 | Kondo et al. ............... 455/146 |
| 2006/0190254 A1 * | 8/2006 | Iser et al. ................... 704/243 |
| 2006/0198362 A1 | 9/2006 | Molev-Shteiman et al. |
| 2007/0156395 A1 | 7/2007 | Ojala |
| 2007/0156846 A1 | 7/2007 | Seward |
| 2007/0225984 A1 * | 9/2007 | Milstein et al. ............ 704/270 |
| 2007/0239428 A1 * | 10/2007 | Milstein et al. .............. 704/5 |
| 2007/0276665 A1 * | 11/2007 | Milstein et al. ............ 704/257 |
| 2008/0046590 A1 | 2/2008 | Surazski et al. |
| 2008/0071523 A1 * | 3/2008 | Oshikiri ...................... 704/219 |
| 2008/0082332 A1 | 4/2008 | Mallett et al. |
| 2008/0279270 A1 | 11/2008 | Zeng |
| 2009/0018826 A1 * | 1/2009 | Berlin ......................... 704/223 |
| 2009/0287477 A1 * | 11/2009 | Maes et al. .................. 704/201 |
| 2010/0076968 A1 * | 3/2010 | Boyns et al. ................ 707/732 |
| 2010/0153108 A1 * | 6/2010 | Szalai et al. ................ 704/243 |
| 2010/0174538 A1 | 7/2010 | Vos ............................. 704/219 |
| 2010/0198600 A1 * | 8/2010 | Masuda ...................... 704/278 |
| 2011/0099009 A1 | 4/2011 | Zopf et al. |
| 2011/0099014 A1 | 4/2011 | Zopf |
| 2011/0099019 A1 | 4/2011 | Zopf |
| 2011/0112836 A1 * | 5/2011 | Kurki-Suonio et al. ...... 704/235 |
| 2011/0125505 A1 | 5/2011 | Vaillancourt et al. |
| 2013/0179161 A1 | 7/2013 | Zopf et al. |

* cited by examiner

USER ATTRIBUTE DERIVATION AND UPDATE FOR NETWORK/PEER ASSISTED SPEECH CODING

CROSS REFERENCE TO RELATED APPLICATIONS

This application claims priority to U.S. Provisional Patent Application No. 61/253,950 filed Oct. 22, 2009 and entitled "Network/Peer Assisted Speech Coding," the entirety of which is incorporated by reference herein.

BACKGROUND OF THE INVENTION

1. Field of the Invention

The invention generally relates to communications systems in which speech signals are transmitted between terminals over a network. In particular, the invention relates to systems and methods for reducing the amount of network bandwidth consumed by the transmission of speech signals between such terminals.

2. Background

The use of mobile communications has increased exponentially since the introduction of the technology just a few decades ago. The increase in users has led to the development of more and more bandwidth-efficient systems, starting with the conversion from the first generation analog-based Advanced Mobile Phone System (AMPS) cellular phone system to the second generation and beyond digital systems. As wireless carriers moved to support more and more users, the underlying speech codec has become increasingly efficient, with an approximate three-fold reduction in bandwidth. Current speech coding standards in today's mobile communications systems use 4-12 kilobits per second (kb/s) for each speech signal.

Although the advance in coding efficiency has been impressive, it is unlikely to continue and most likely is near its limit given the current set of design parameters. The performance of speech codecs can be measured by a set of attributes that include: bit rate, speech quality, degradation caused by channel impairments, delay, and computational complexity (both cycle usage and memory usage). Generally, there is a trade-off between good performance in one or more attributes and lower performance in others. The interplay between the attributes is governed by the fundamental laws of information theory, the properties of the speech signal, limitations in the equipment used, and limitations in human knowledge.

To design a speech codec, one must know the desired values for its attributes. A common approach to developing a speech codec is to constrain all attributes but one quantitatively. The design objective is then to optimize the remaining attribute (usually speech quality or bit rate) subject to these constraints.

Today's speech coding systems have been designed to minimize bit rate and maximize speech quality while maintaining limits of computational complexity, memory and storage as dictated by the economics of the terminals and the desire for smaller, sleeker handsets with longer battery life. However, as the technology used to implement these terminals continues to follow Moore's Law, the computation speed of processors continues to increase, the capacity of memory components continues to grow, and the power consumption for these devices continues to shrink. Unfortunately, however, the available bandwidth for communications remains constant.

As the use of mobile communications systems continue to grow, the pressure to increase capacity will mount. As mentioned above, given the current constraints on computational complexity and memory usage, it is unlikely that the speech signal can be compressed much further without compromising quality. However, as the capabilities of terminals and network nodes increase, the limits of various system attributes may be reconsidered and a speech codec may potentially be designed that significantly further reduces the bandwidth requirements.

For example, today's speech codecs are generally designed for speaker-independent use. However, mobile communications appears to be moving to a use-scenario in which everyone has their own cellular phone or communication device. In addition, the majority of telephone calls today are between a small set of people. These facts are not exploited at all in current speech compression schemes. The core network today is involved in call setup, call routing, billing, and the like, but is not exploited in any way to improve the efficiency of the speech codec.

BRIEF SUMMARY OF THE INVENTION

Systems, methods and apparatuses are described herein for deriving and updating user attribute information about users of a communications system. A communications network is then used to transfer the user attribute information to communication terminals, which use the user attribute information to configure a speech codec to operate in a speaker-dependent manner during a communication session, thereby improving speech coding efficiency. In a network-assisted model, the user attribute information is stored on the communications network and selectively transmitted to the communication terminals while in a peer-assisted model, the user attribute information is derived by and transferred between communication terminals.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
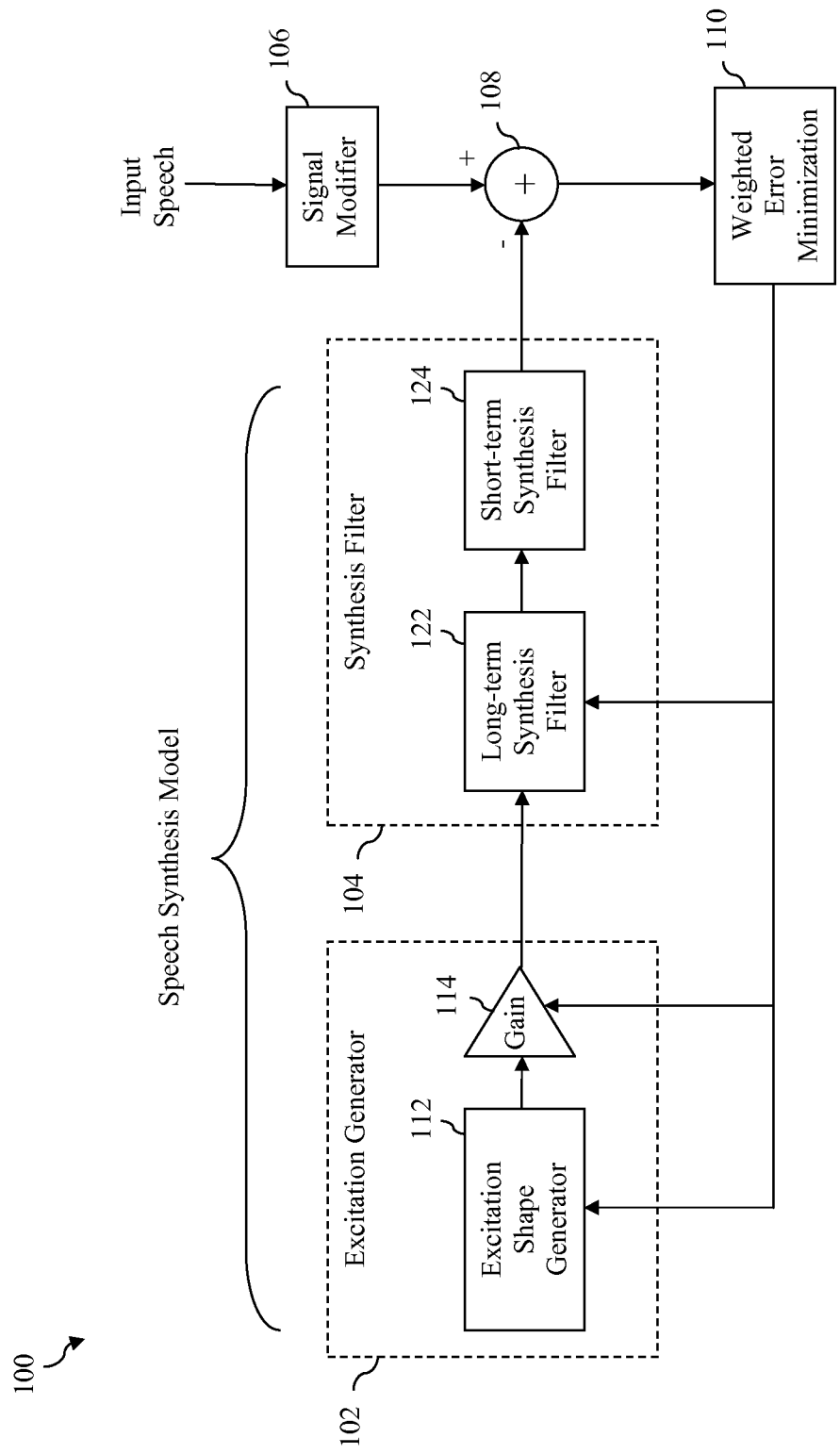
FIG. 1 is a block diagram of a conventional analysis-by-synthesis speech codec.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

The following detailed description of the present invention refers to the accompanying drawings that illustrate exemplary embodiments consistent with this invention. Other embodiments are possible, and modifications may be made to the embodiments within the spirit and scope of the present invention. Therefore, the following detailed description is not meant to limit the invention. Rather, the scope of the invention is defined by the appended claims.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

B. Speaker-Dependent Speech Coding in Accordance with Embodiments of the Present Invention As noted in the Background section above, conventional speech codecs are designed for speaker-independent use. That is to say that conventional speech codecs are trained and optimized to work across the entire populous of users. Embodiments of the present invention described herein are premised on the observation that significant coding efficiency can be gained if a speech codec is trained on a single user. This concept will now be explained with respect to an example conventional analysis-by-synthesis speech codec 100 as depicted in FIG. 1. The analysis-by-synthesis class of speech codecs includes code excited linear prediction (CELP) speech codecs, which are the predominant speech codecs utilized in today's mobile communication systems. Due to their high coding efficiency, variations of CELP coding techniques together with other advancements have enabled speech waveform coders to halve the bit rate of 32 kilobits per second (kb/s) adaptive differential pulse-code modulation (ADPCM) three times while maintaining roughly the same speech quality. Analysis-by-synthesis speech codec 100 of FIG. 1 is intended to represent a class of speech codecs that includes conventional CELP codecs.

As shown in FIG. 1, analysis-by-synthesis speech codec 100 includes an excitation generator 102, a synthesis filter 104, a signal modifier 106, a combiner 108 and a weighted error minimization module 110. During encoding, an input speech signal representing the speech of a user is processed by signal modifier 106 to produce a modified input speech signal. A speech synthesis model that comprises excitation generator 102 and synthesis filter 104 operates to generate a synthesized speech signal based on certain model parameters and the synthesized speech signal is subtracted from the modified input speech signal by combiner 108. The difference, or error, produced by combiner 108 is passed to weighted error minimization module 110 which operates to select model parameters that will result in the smallest weighted error in accordance with a predefined weighted error minimization algorithm. By selecting model parameters that produce the smallest weighted error, a synthesized speech signal can be generated that is deemed "closest" to the input speech signal.

As further shown in FIG. 1, excitation generator 102 includes an excitation shape generator 112 and a gain module 114. Excitation shape generator 112 operates to produce different excitation shapes from a set of predefined excitation shapes. Gain module 114 operates to apply a gain to the excitation shape produced by excitation shape generator 112. The output of gain module 114 is passed to synthesis filter which includes a long-term synthesis filter 122 and a short-term synthesis filter 124. Long-term synthesis filter 122 is designed to model certain long-term characteristics of the input speech signal and is sometimes referred to as a pitch filter. The operation of long-term synthesis filter 122 is governed by certain parameters that typically include one or more long-term synthesis filter coefficients (sometimes referred to as pitch taps) and a pitch period or pitch lag. Short-term synthesis filter 124 is designed to model certain short-term characteristics of the input speech signal. The operation of short-term synthesis filter 124 is governed by certain parameters that typically include short-term filter coefficients also known as Linear Prediction Coefficients.

During the encoding process, the model parameters used to produce the synthesized speech signal are encoded, or quantized. The encoded model parameters are then passed to a decoder. A new set of model parameters is selected and encoded for each segment in a series of segments that make up the input speech signal. These segments may be referred to, for example, as frames. The parameters that are encoded typically include an excitation shape used by excitation shape generator 112, a gain applied by gain module 114, one or more long-term synthesis filter coefficients and a pitch period used by long-term synthesis filter 122 and Linear Prediction Coefficients used by short-term synthesis filter 124. During decoding, the speech synthesis model is simply recreated by decoding the encoded model parameters and then utilizing the model parameters to generate the synthesized (or decoded) speech signal. The operation of an analysis-by-synthesis speech codec is more fully described in the art.

The coding bit rate of analysis-by-synthesis speech codec 100 can be reduced significantly if certain speaker-dependent information is provided to the codec. For example, short-term synthesis filter 124 is designed to model the vocal tract of the user. However, the vocal tract varies significantly across different users and results in a very different formant structure given the same sound production. The formants may vary in both frequency and bandwidth. In a speaker-independent speech codec such as codec 100, the quantization scheme for the short-term filter parameters must be broad enough to capture the variations among all expected users. In contrast, if the codec could be trained specifically on a single user, then the quantization scheme for the short-term filter parameters need only cover a much more limited range.

As another example, long-term synthesis filter 122 is characterized by the pitch or fundamental frequency of the speaker. The pitch varies greatly across the population, especially between males, females and children. In a speaker-independent speech codec such as codec 100, the quantization scheme for the pitch period must be broad enough to capture the complete range of pitch periods for all expected users. In contrast, if the codec could be trained specifically on a single user, then the quantization scheme for the pitch period need only cover a much more limited range.

As a still further example, excitation generator 102 provides the excitation signal to synthesis filter 104. Like the vocal tract and the pitch period, the excitation signal can be expected to vary across users. In a speaker-independent speech codec such as codec 100, the quantization scheme for the excitation signal must be broad enough to capture the variations among all expected users. In contrast, if the codec could be trained specifically on a single user, then the quantization scheme for the excitation signal need only cover a much more limited range.

In summary, then, by training the speech codec on a specific user and thereby limiting the range of the parameters used to generate the synthesized speech signal, the number of bits used to encode those parameters can be reduced, thereby improving the coding efficiency (i.e., reducing the coding bit rate) of the codec. This concept is not limited to the particular example analysis-by-synthesis parameters discussed above (i.e., vocal tract, pitch period and excitation) but can also be applied to other parameters utilized by analysis-by-synthesis speech codecs. Furthermore, this concept is not limited to analysis-by-synthesis or CELP speech codecs but can be applied to a wide variety of speech codecs.

Figure 2:
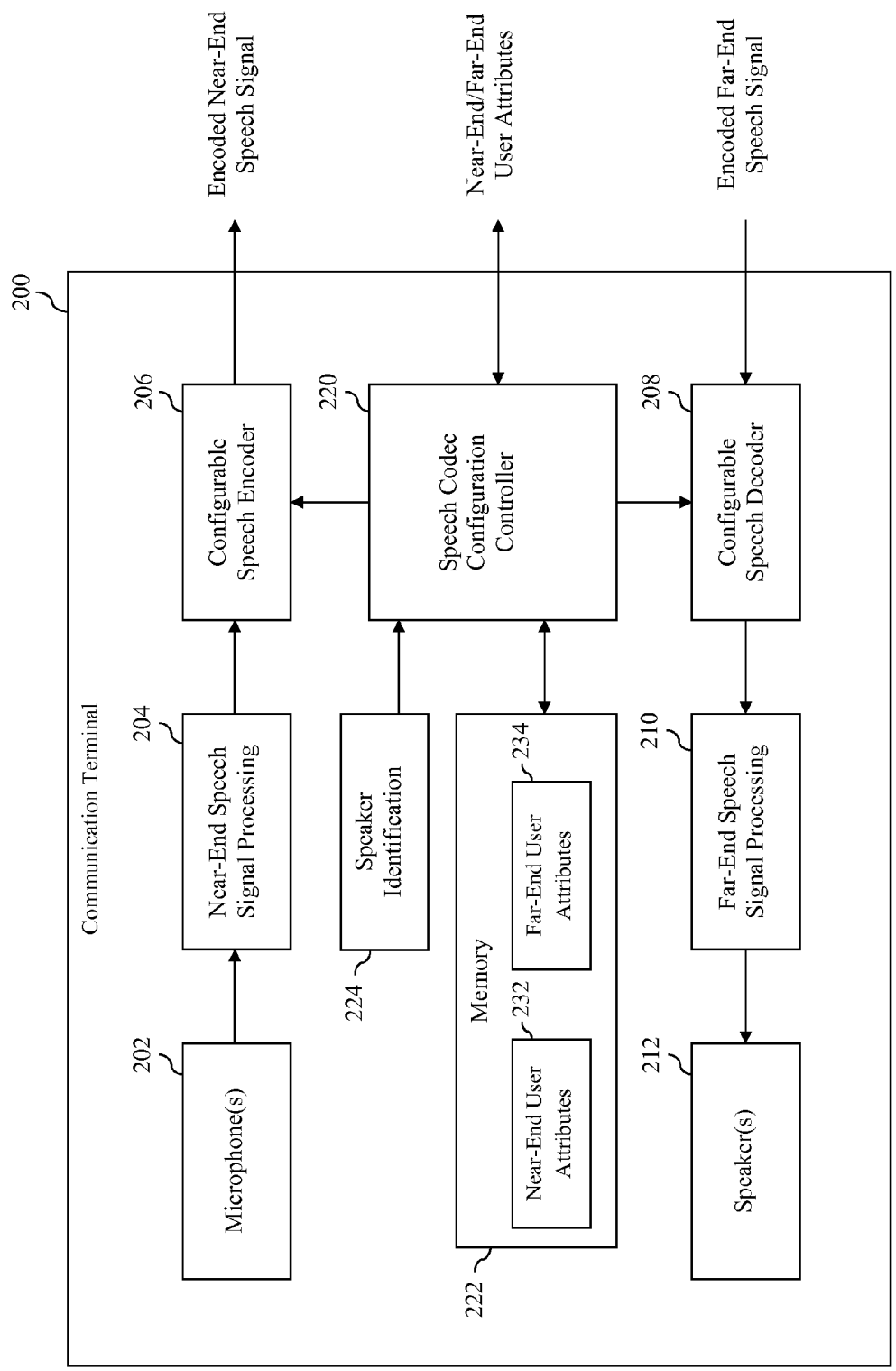
FIG. 2 is a block diagram of a communications terminal in accordance with an embodiment of the present invention.

FIG. 2 depicts a block diagram of a communication terminal 200 in accordance with an embodiment of the present invention that is designed to leverage the foregoing concept to achieve improved coding efficiency. As used herein, the term "communication terminal" is intended to broadly encompass any device or system that enables a user to participate in a communication session with a remote user such as, but not limited to, a mobile telephone, a landline telephone, a Voice over Internet Protocol (VoIP) telephone, a wired or wireless headset, a hands-free speakerphone, a videophone, an audio teleconferencing system, a video teleconferencing system, or the like. The term "communication terminal" also encompasses a computing device or system, such as a desktop computer system, a laptop computer, a tablet computer, or the like, that is suitably configured to conduct communication sessions between remote users. These examples are non-limiting and the term "communication terminal" may encompass other types of devices or systems as well.

As shown in FIG. 2, communication terminal 200 includes one or more microphones 202, a near-end speech signal processing module 204, a configurable speech encoder 206, a configurable speech decoder 208, a far-end speech signal processing module 210, one or more speakers 212, a speech codec configuration controller 220, a memory 222, and a speaker identification module 224.

Microphone(s) 202 comprise one or more acoustic-to-electric transducers that operate in a well-known manner to convert sound waves associated with the voice of a near-end speaker into one or more analog near-end speech signals. The analog near-end speech signal(s) produced by microphone(s) 202 are provided to near-end speech signal processing module 204. Near-end speech signal processing module 204 performs signal processing operations upon the analog near-end speech signal(s) to produce a digital near-end speech signal for encoding by configurable speech encoder 206. Such signal processing operations include analog-to-digital (A/D) conversion and may also include other operations that tend to improve the quality and intelligibility of the digital near-end speech signal produced by near-end speech signal processing module 204 including but not limited to acoustic echo cancellation, noise suppression, and/or acoustic beamforming.

Configurable speech encoder 206 operates to encode the digital near-end speech signal produced by near-end speech signal processing module 204 to generate an encoded near-end speech signal that is then transmitted to a remote communication terminal via a communications network. As will be further discussed below, the manner in which configurable speech encoder 206 performs the encoding process may be selectively modified by speech codec configuration controller 220 to take into account certain user attributes associated with the near-end speaker to achieve a reduced coding bit rate.

Configurable speech decoder 208 operates to receive an encoded far-end speech signal from the communications network, wherein the encoded far-end speech signal represents the voice of a far-end speaker participating in a communication session with the near-end speaker. Configurable speech decoder 208 operates to decode the encoded far-end speech signal to produce a digital far-end speech signal suitable for processing by far-end speech signal processing module 210. As will be further discussed below, the manner in which configurable speech decoder 208 performs the decoding process may be selectively modified by speech codec configuration controller 220 to take into account certain user attributes associated with the far-end speaker to achieve a reduced coding bit rate.

The digital far-end speech signal produced by configurable speech decoder 208 is provided to far-end speech signal processing module 210 which performs signal processing operations upon the digital far-end speech signal to produce one or more analog far-ends speech signals for playback by speaker(s) 212. Such signal processing operations include digital-to-analog (D/A) conversion and may also include other operations that tend to improve the quality and intelligibility of the analog far-end speech signal(s) produced by far-end speech signal processing module 210 including but not limited to acoustic echo cancellation, noise suppression and/or audio spatialization. Speaker(s) 212 comprise one or more electromechanical transducers that operate in a well-known manner to convert an analog far-end speech signal into sound waves for perception by a user.

Speech codec configuration controller 220 comprises logic that selectively configures each of configurable speech encoder 206 and configurable speech decoder 208 to operate in a speaker-dependent manner. In particular, speech codec configuration controller 220 selectively configures configurable speech encoder 206 to perform speech encoding in a manner that takes into account user attributes associated with a near-end speaker in a communication session and selectively configures configurable speech decoder 206 to perform speech decoding in a manner that takes into account user attributes associated with a far-end speaker in the communication session. As shown in FIG. 2, the user attributes associated with the near-end speaker and the far-end speaker are stored in memory 222 on communication terminal 200 and are referred to, respectively, as near-end user attributes 232 and far-end user attributes 234. Depending upon the implementation, near-end user attributes 232 may be generated locally by communication terminal 200 or obtained from a remote entity via a network. As will be discussed subsequently herein, the obtaining and/or selection of the appropriate set of near-end user attributes may be facilitated by operations performed by speaker identification module 224. Far-end user attributes 234 are obtained from a remote entity via a network. Details regarding how and when communication terminal 200 obtains such user attributes will be provided elsewhere herein.

Generally speaking, user attributes may comprise any speaker-dependent characteristics associated with a near-end or far-end speaker that relate to a model used by configurable speech encoder 206 and configurable speech decoder 208 for coding speech. Thus, with continued reference to the example analysis-by-synthesis speech codec 100 described above in reference to FIG. 1, such user attributes may comprise information relating to an expected vocal tract of a speaker, an expected pitch of the speaker, expected excitation signals associated with the speaker, or the like.

Speech codec configuration controller 220 uses these attributes to modify a configuration of configurable speech encoder 206 and/or configurable speech decoder 208 so that such entities operate in a speaker-dependent manner. Modifying a configuration of configurable speech encoder 206 and/or configurable speech decoder 208 may comprise, for example, replacing a speaker-independent quantization table or codebook with a speaker-dependent quantization table or codebook or replacing a first speaker-dependent quantization table or codebook with a second speaker-dependent quantization table or codebook. Modifying a configuration of configurable speech encoder 206 and/or configurable speech decoder 206 may also comprise, for example, replacing a speaker-independent encoding or decoding algorithm with a speaker-dependent encoding or decoding algorithm or replacing a first speaker-dependent encoding or decoding algorithm with a second speaker-dependent encoding or decoding algorithm. Still other methods for modifying the configuration of configurable speech encoder 206 and/or configurable speech decoder 208 may be applied.

Figure 3:
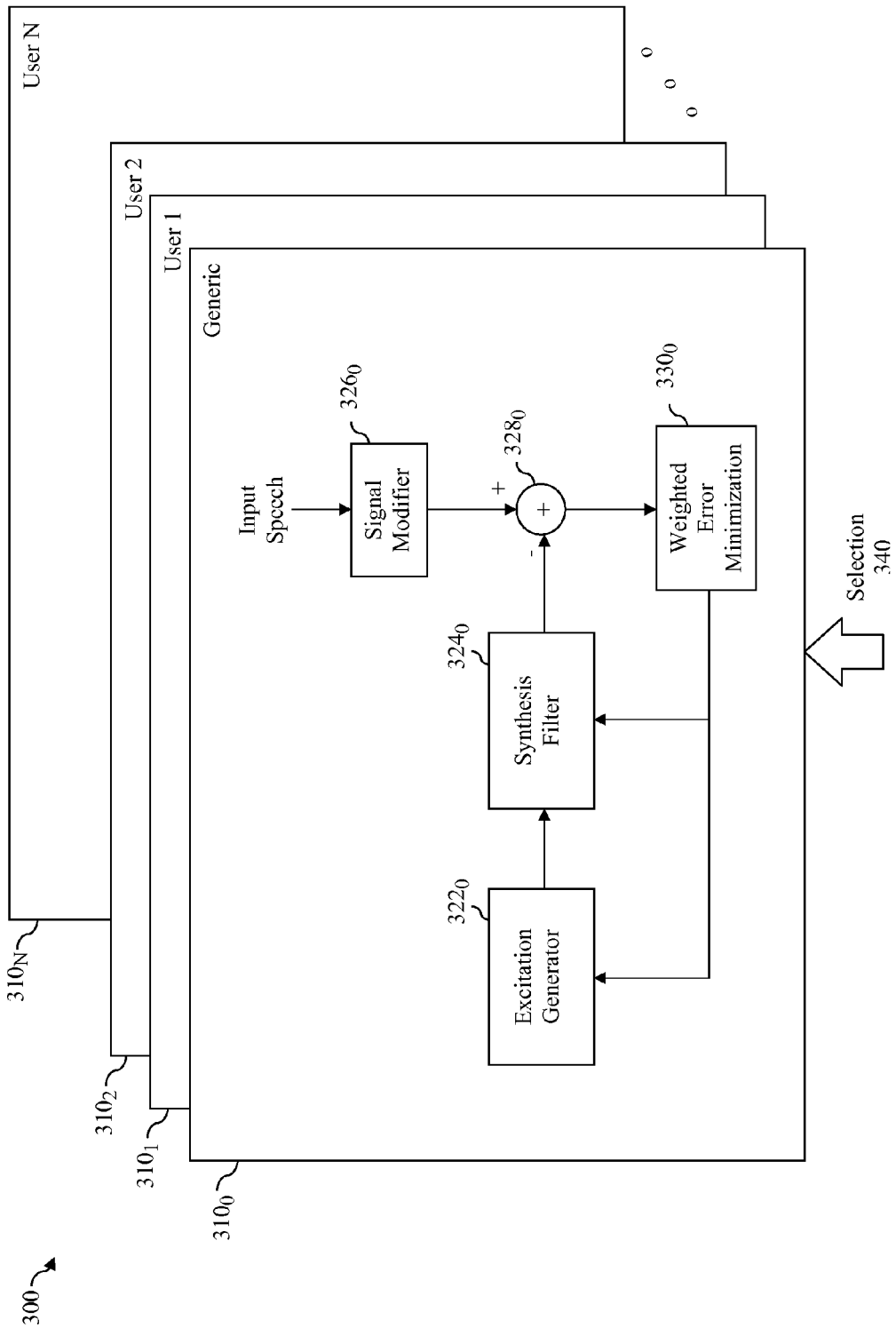
FIG. 3 is a block diagram of a configurable analysis-by-synthesis speech codec in accordance with an embodiment of the present invention.

FIG. 3 is a block diagram that illustrates a configurable analysis-by-synthesis speech codec 300 in accordance with an embodiment of the present invention. Speech codec 300 may be used to implement, for example, configurable speech encoder 206 and/or configurable speech decoder 208 as described above in reference to communication terminal 200 of FIG. 2. As shown in FIG. 3, by means of a selection operation 340, speech codec 300 may be configured to operate in one of a plurality of different operating modes, including a generic mode that utilizes a generic analysis-by-synthesis speech codec configuration $310_0$ and a plurality of speaker-dependent modes each of which uses a different speaker-dependent analysis-by-synthesis speech codec configuration $310_1, 310_2, \ldots, 310_N$ corresponding to a plurality of different users 1, 2, . . . N.

As further shown in FIG. 3, generic speech codec configuration $310_0$ includes an excitation generator $322_0$, a synthesis filter $324_0$, a signal modifier $326_0$, a combiner $328_0$, and a weighted error minimization module $330_0$. Each of these elements is configured to operate in a speaker-independent fashion. Speaker-dependent speech codec configurations $310_1$-$310_N$ also include corresponding versions of these elements (e.g., speaker-dependent speech codec configuration $310_1$ includes an excitation generator $322_1$, a synthesis filter $324_1$, a signal modifier $326_1$, a combiner $328_1$ and a weighted error minimization module $330_1$), except that one or more elements associated with a particular speaker-dependent speech codec configuration may be configured to operate in a speaker-dependent manner. For example, speaker-dependent speech codec configuration $310_1$ associated with user 1 may be configured to quantize a pitch period associated with synthesis filter $324_1$ using a speaker-dependent pitch quantization table that is selected based on user attributes associated with user 1. This is merely one example, and persons skilled in the relevant art(s) will appreciate that numerous other modifications may be made to place speech codec 300 in a speaker-dependent mode of operation. Although FIG. 3 depicts a completely different set of codec elements for each speaker-dependent configuration, it is to be appreciated that not every codec element need be modified to operate in a speaker-dependent manner.

It is noted that configurable analysis-by-synthesis speech codec 300 has been presented herein by way of example only. As will be appreciated by persons skilled in the relevant art(s) based on the teachings provided herein, any number of different speech codecs may be designed to operate in a plurality of different speaker-dependent modes based on user attributes associated with a corresponding plurality of different speakers.

C. Coding of Speaker-Independent and Speaker-Dependent Components of a Speech Signal in Accordance with an Embodiment of the Present Invention As discussed in the preceding section, certain embodiments of the present invention achieve increased coding efficiency by training a speech codec on a single user—i.e., by causing the speech codec to operate in a speaker-dependent manner. As will be discussed in this section, increased coding efficiency can also be achieved by decomposing a speech signal into a speaker-independent component and a speaker-dependent component. The speaker-independent component of a speech signal is also referred to herein as speech "content."

1. Introductory Concepts

In modern communication systems, speech is represented by a sequence of bits. The primary advantage of this binary representation is that it can be recovered exactly (without distortion) from a noisy channel, and does not suffer from decreasing quality when transmitted over many transmission legs. However, the bit rate produced by an A/D converter is too high for practical, cost-effective solutions for such applications as mobile communications and secure telephony. As a result, the area of speech coding was born. The objective of a speech coding system is to reduce the bandwidth required to transmit or store the speech signal in digital form.

Information theory refers to branch of applied mathematics and electrical engineering that was developed to find fundamental limits on signal processing operations such as compressing data and reliably storing and communicating data. According to information theory, a speech signal can be represented in terms of its message content, or information. Generally speaking, a message is made up of a concatenation of elements from a finite set of symbols. In speech, the symbols are known as phonemes. Each language has its own distinctive set of phonemes, typically numbering between 30 and 50.

In information theory, a key aspect in determining the information rate of a source is the symbol rate. For speech, the phoneme rate is limited by the speech production process and the physical limits of the human vocal apparatus. These physical limits place an average rate of about 10 phonemes per second on human speech. Considering that a 6-bit code (64 levels) is sufficient to represent the complete set of phonemes in a given language, one obtains an estimate of 60 bits per second for the average information rate of speech. The above estimate does not take into account factors such as the identity and emotional state of the speaker, the rate of speaking, the loudness of the speech, etc.

In light of the foregoing, it can be seen that the content, or speaker-independent component, of a speech signal can be coded at a very high rate of compression. An embodiment of the present invention takes advantage of this fact by decomposing a speech signal into a speaker-independent component and a speaker-dependent component. For example, FIG. 4 is a block diagram of a communications system 400 in accordance with an embodiment of the present invention that performs speech coding by decomposing a speech signal into speaker-independent and speaker-dependent components.

Figure 4:
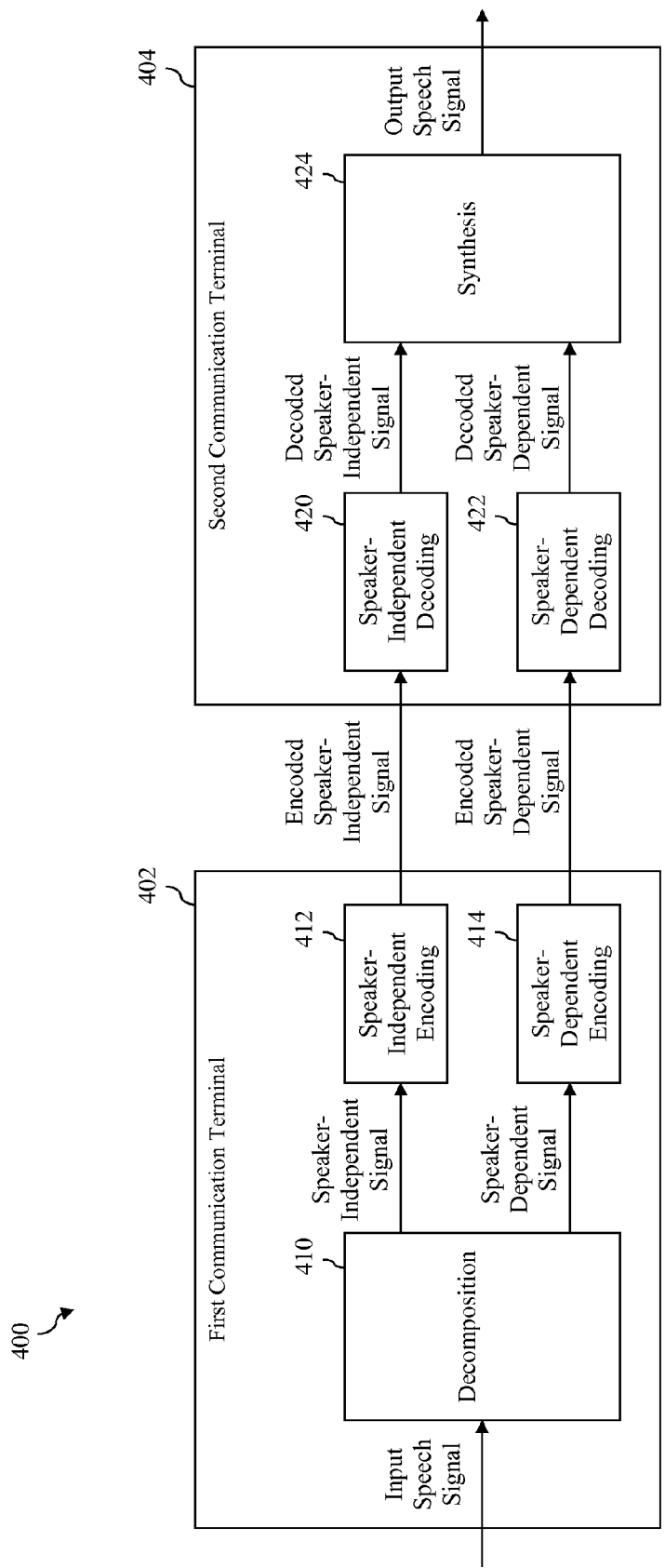
FIG. 4 is a block diagram of a communications system in accordance with an embodiment of the present invention that performs speech coding by decomposing a speech signal into speaker-independent and speaker-dependent components.

As shown in FIG. 4, communications system 400 includes a first communication terminal 402 and a second communication terminal 404. First communication terminal 402 includes a decomposition module 410, a speaker-independent encoding module 412 and a speaker-dependent encoding module 414. Decomposition module 410 receives an input speech signal and decomposes the input speech signal into a speaker-independent signal and a speaker-dependent signal. Speaker-independent encoding module 412 encodes the speaker-independent signal to produce an encoded speaker-independent signal. Speaker-dependent encoding module 414 encodes the speaker-dependent signal to produce an encoded speaker-dependent signal. The encoded speaker-independent signal and the encoded speaker-dependent signal are transmitted via a communication network to second communication terminal 404.

Second communication terminal 404 includes a speaker-independent decoding module 420, a speaker-dependent decoding module 422 and a synthesis module 424. Speaker-independent decoding module 420 decodes the encoded speaker-independent signal that has been transmitted across the communication network to produce a decoded speaker-independent signal. Speaker-dependent decoding module 422 decodes the encoded speaker-dependent signal that has been transmitted across the communication network to produce a decoded speaker-dependent signal. Synthesis module 424 receives the decoded speaker-independent signal and the decoded speaker-dependent signal and utilizes them to synthesize an output speech signal.

In system 400, the speaker-independent signal may comprise phonemes (as noted above), text, or some other symbolic representation of the information content of the input speech signal. In an embodiment of system 400 in which phonemes are used, the encoded speaker-independent signal that is transmitted from first communication terminal 402 to second communication terminal 404 comprises a coded phoneme stream. For an identical utterance spoken by two different people, the coded phoneme stream would also be identical. This stream can be coded at an extremely high rate of compression.

The speaker-dependent signal in example system 400 carries the information required to synthesize an output speech signal that approximates the input speech signal when starting with the decoded symbolic representation of speech content. Such information may comprise, for example, information used in conventional speech synthesis systems to convert a phonetic transcription or other symbolic linguistic representation into speech or information used by conventional text-to-speech (TTS) systems to convert text to speech. Depending upon the implementation, such information may include, for example, parameters that may be associated with a particular phoneme such as pitch, duration and amplitude, parameters that may be associated with an utterance such as intonation, speaking rate and loudness (sometimes collectively referred to as prosody), or more general parameters that impact style of speech such as emotional state and accent.

As discussed above in reference to communication terminal 200 of FIG. 2 and as will be discussed in more detail herein, a communication terminal in accordance with an embodiment of the present invention can obtain and store a set of user attributes associated with a near-end speaker and a far-end speaker involved in a communication session, wherein the user attributes comprise speaker-dependent characteristics associated with those speakers. In further accordance with example system 400 of FIG. 4, the user attributes may comprise much of the speaker-dependent information required by synthesis module 424 to synthesize the output speech signal. If it is assumed that second communication terminal 404 is capable of obtaining such user attribute information, then much of the speaker-dependent information will already be known by second communication terminal 404 and need not be transmitted from first communication terminal 402. Instead, only short-term deviations from the a priori speaker-dependent model need to be transmitted. This can lead to a significant reduction in the coding bit rate and/or an improved quality of the decoded speech signal.

Thus, by separating a speech signal into speaker-independent and speaker-dependent components and providing user attributes that include much of the speaker-dependent information to the communication terminals, the coding bit rate can be significantly reduced and/or the quality of the decoded speech signal can be increased. Furthermore, as will be discussed in the following sub-section, in certain embodiments knowledge of the content that is included in the speaker-independent signal can be used to achieve further efficiency when encoding certain parameters used to model the speaker-dependent signal.

2. Exemplary Codec Designs

The foregoing concept of decomposing a speech signal into speaker-independent and speaker-dependent components in order to improve coding efficiency can be applied to essentially all of the speech coding schemes in use today. For example, the concept can advantageously be applied to conventional analysis-by-synthesis speech codecs. A general example of such a speech codec was previously described in reference to FIG. 1.

For example, consider short term synthesis filter 124 of analysis-by-synthesis speech codec 100 of FIG. 1. The filter analysis is typically performed at a rate of 5-20 milliseconds (ms) and models the spectral envelope of the input speech signal. The quantization scheme is trained to cover the complete range of input speech for a wide range of speakers. However, it is well known that the formant frequencies of the spectral envelope vary broadly with the speech content. The average formant frequencies for different English vowels are shown in Table 1, which was derived from L. R. Rabiner, R. W. Schafer, "Digital Processing of Speech Signals," Prentice-Hall, 1978.

TABLE 1

Average Formant Frequencies for Vowels
Formant Frequencies for the Vowels

| Symbol for Vowel | Typical Word | F1 | F2 | F3 |
| --- | --- | --- | --- | --- |
| IY | Beet | 270 | 2290 | 3010 |
| I | Bit | 390 | 1990 | 2550 |
| E | Bet | 530 | 1840 | 2480 |
| AE | Bat | 660 | 1720 | 2410 |
| UH | But | 520 | 1190 | 2390 |
| A | Hot | 730 | 1090 | 2440 |
| OW | Bought | 570 | 840 | 2410 |
| U | Foot | 440 | 1020 | 2240 |
| OO | Boot | 300 | 870 | 2240 |
| ER | Bird | 490 | 1350 | 1690 |

If the quantization scheme makes use of speaker-independent information, significant coding efficiency can be gained. For example, if the speaker-independent information comprises a phoneme stream, a different and more efficient quantization table could be used for each phoneme.

It is also known how the formants vary with time as a sound is spoken. For example, in the foregoing reference by L. R. Rabiner and R. W. Schafer, the time variations of the first two formants for diphthongs are depicted. This information can be combined with the known prosody of a speaker to predict how the formant will vary over time given the current speaker-independent information (phoneme, etc.). Alternatively, the time variations of the formants for different spoken content can be recorded for a particular speaker and included in the user attribute information for the speaker to guide the quantization. The quantizer would then simply code the difference (residual) between the predicted spectral shape (given the current speaker-independent information and known evolution over time) and the observed spectral shape.

Similar concepts can also be used for other parts of an analysis-by-synthesis speech codec. The excitation signal will have similar dependence on the speaker-independent information. Different codebooks, number of pulses, pulse positions, pulse distributions, or the like, can be used depending on the received speaker-independent signal. Gain vs. time profiles can be used based on the speaker-independent signal. For example, in one embodiment, a different gain profile can be used for the duration of each phoneme.

Figure 5:
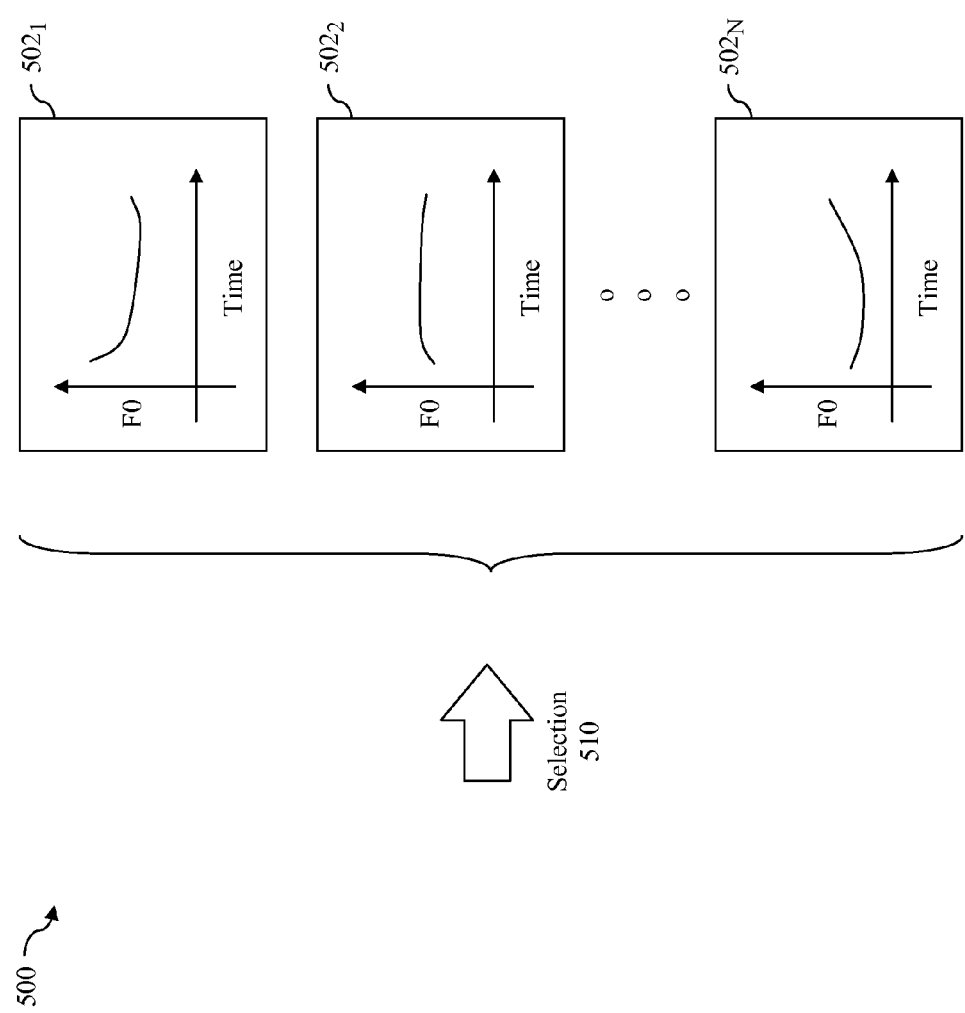
FIG. 5 illustrates a scheme for selecting one of a plurality of predicted pitch contours based on the content of a speaker-independent signal in accordance with an embodiment of the present invention.

Pitch contours can also be selected based on the speaker-independent signal. This approach can be combined with speaker-dependent pitch information. For example, Canadian talkers often have a rising pitch at the end of a sentence. This knowledge can be combined with the speaker-independent signal to predict the pitch contour and thereby increase coding efficiency. An example of such a scheme is shown in FIG. 5. In particular, FIG. 5 illustrates the selection 510 of one of a plurality of predicted pitch contours $502_1$-$502_N$, each of which indicates how the pitch of a particular utterance is expected to vary over time. The selection 510 may be made based on the current content of the speaker-independent signal, such as a current phoneme, series of phonemes, or the like. The selected predicted pitch contour may also be modified based on speaker-dependent characteristics of the speaker such as accent or emotional state. After the appropriate predicted pitch contour has been selected, the speech encoder need only encode the difference between the observed pitch contour and the selected predicted pitch contour.

Figure 6:
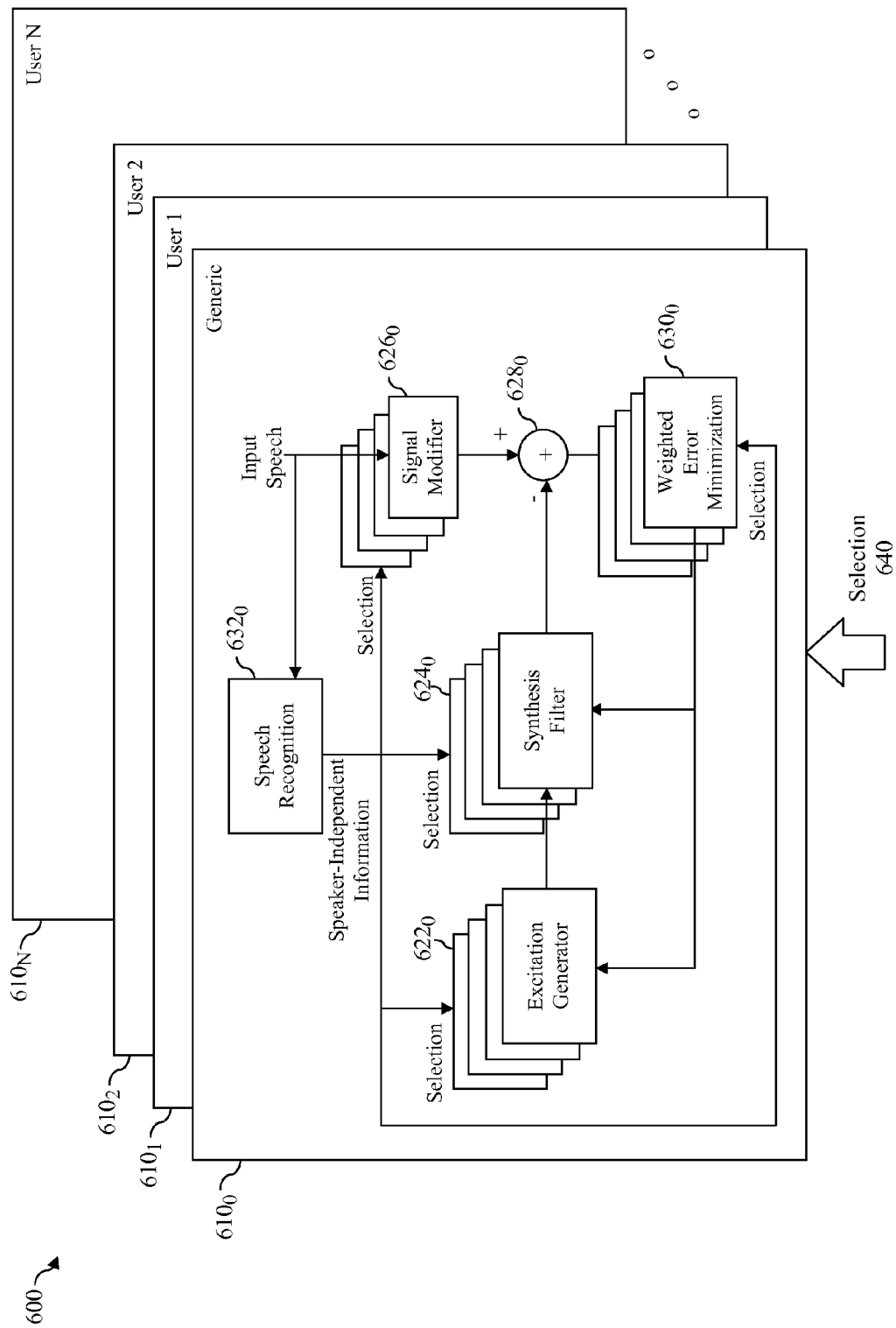
FIG. 6 is a block diagram of a modified analysis-by-synthesis speech codec in accordance with an embodiment of the present invention that is configurable to operate in a speaker-dependent manner and that also operates in a content-dependent manner.

In accordance with the foregoing, the speech codec can be made both content-dependent and speaker-dependent. By way of example, FIG. 6 depicts a block diagram of a modified analysis-by-synthesis speech codec 600 that is configurable to operate in a speaker-dependent manner and that also operates in a content-dependent manner. Speech codec 600 may used to implement, for example, configurable speech encoder 206 and/or configurable speech decoder 208 as described above in reference to communication terminal 200 of FIG. 2.

As shown in FIG. 6, by means of a selection operation 640, speech codec 600 may be configured to operate in one of a plurality of different operating modes, including a generic mode that utilizes a generic modified analysis-by-synthesis speech codec configuration $610_0$ and a plurality of speaker-dependent modes each of which uses a different speaker-dependent modified analysis-by-synthesis speech codec configuration $610_1, 610_2, \ldots, 610_N$ corresponding to a plurality of different users $1, 2, \ldots N$.

As further shown in FIG. 6, generic speech codec configuration $610_0$ includes a speech recognition module $632_0$, a set of excitation generators $622_0$, a set of synthesis filters $624_0$, a set of signal modifiers $626_0$, a combiner $628_0$, and a set of weighted error minimization modules $630_0$. Each of these elements is configured to operate in a speaker-independent fashion. Speaker-dependent speech codec configurations $610_1$-$610_N$ also include corresponding versions of these elements (e.g., speaker-dependent speech codec configuration $610_1$ includes a set of excitation generators $622_1$, a set of synthesis filters $624_1$, a set of signal modifiers $626_1$, a combiner $628_1$ and a set of weighted error minimization modules $620_1$), except that one or more elements associated with a particular speaker-dependent speech codec configuration may be configured to operate in a speaker-dependent manner.

For each speech codec configuration $610_0$-$610_N$, speech recognition module 632 operates to decompose an input speech signal into a symbolic representation of the speech content, such as for example, phonemes, text or the like. This speaker-independent information is then used to select an optimal configuration for different parts of the speech codec. For example, the speaker-independent information may be used to select an excitation generator from among the set of excitation generators 622 that is optimally configured for the current speech content, to select a synthesis filter from among the set of synthesis filters 624 that is optimally configured for the current speech content, to select a signal modifier from among the set of signal modifiers 626 that is optimally configured for the current speech content, and/or to select a weighted error minimization module from among the set of weighted error minimization modules 630 that is optimally configured for the current speech content.

The optimal configuration for a particular element of speech codec 600 may comprise the loading of a different codebook, the use of a different encoding/decoding algorithm, or a combination of any of the foregoing. The codebooks and/or algorithms may either comprise generic codebooks and/or algorithms or trained codebooks and/or algorithms associated with a particular speaker.

Figure 7:
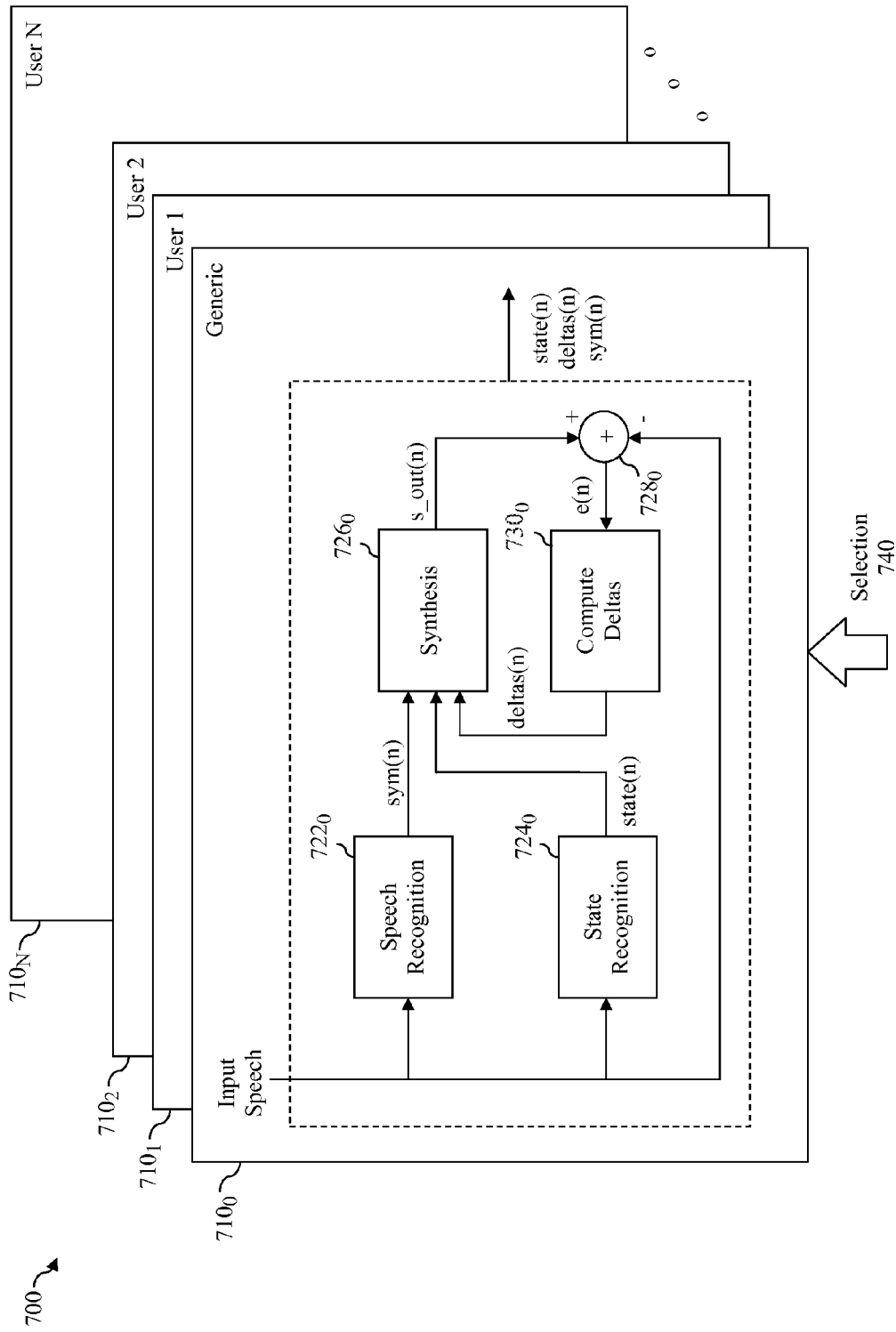
FIG. 7 depicts a block diagram of a configurable speech codec in accordance with an embodiment of the present invention that operates both in a speaker-dependent manner and a content-dependent manner.

It is noted that modified analysis-by-synthesis speech codec 600 has been presented herein by way of example only. As will be appreciated by persons skilled in the relevant art(s), any number of different speech codecs may be designed in accordance with the teachings provided herein to operate in both a speaker-dependent and content-dependent manner. By way of further example, FIG. 7 depicts a block diagram of a configurable speech codec 700 that operates both in a speaker-dependent manner and a content-dependent manner. Speech codec 700 may used to implement, for example, configurable speech encoder 206 and/or configurable speech decoder 208 as described above in reference to communication terminal 200 of FIG. 2.

As shown in FIG. 7, by means of a selection operation 740, speech codec 700 may be configured to operate in one of a plurality of different operating modes, including a generic mode that utilizes a generic speech codec configuration $710_0$ and a plurality of speaker-dependent modes each of which uses a different speaker-dependent speech codec configuration $710_1, 710_2, \ldots, 710_N$ corresponding to a plurality of different users $1, 2, \ldots N$.

As further shown in FIG. 7, generic speech codec configuration $710_0$ includes a speech recognition module $722_0$, a state recognition module $724_0$, a synthesis module $726_0$, a combiner $728_0$, and a compute deltas module $730_0$. Each of these elements is configured to operate in a speaker-independent fashion. Speaker-dependent speech codec configurations $710_1$-$710_N$ also include corresponding versions of these elements (e.g., speaker-dependent speech codec configuration $710_1$ includes a speech recognition module $722_1$, a state recognition module $724_1$, a synthesis module $726_1$, a combiner $728_1$ and a compute deltas module $730_1$), except that one or more elements associated with a particular speaker-dependent speech codec configuration may be configured to operate in a speaker-dependent manner. Although FIG. 7 depicts a completely different set of codec elements for each speaker-dependent configuration, it is to be appreciated that not every codec element need be modified to operate in a speaker-dependent manner.

For each speech codec configuration $710_0$-$710_N$, speech recognition module 722 operates to convert an input speech signal into a stream of symbols, sym(n), that represents the spoken content. The symbols may comprise, for example, a phoneme representation, a text representation, or the like. The symbol stream is speaker-independent. Since each speech codec configuration $710_0$-$710_N$ includes its own speech recognition module $722_0$-$722_N$, this module may operate in a speaker-dependent manner, taking into account user attributes associated with a particular speaker. For example, a speech recognition module associated with a particular speech codec configuration may utilize one or more of a speaker-specific acoustic model, a speaker-specific pronunciation dictionary, a speaker-specific language model, or the like.

For each speech codec configuration $710_0$-$710_N$, the input speech signal is also received by state recognition module 724. State recognition module 724 analyzes the input speech signal to identify the expressive state of the speaker, denoted state(n). In one embodiment, the expressive state of the speaker comprises the emotional state of the speaker. For example, the emotional state may be selected from one of a set of emotional states, wherein each emotional state is associated with one or more parameters that can be used to synthesize the speech of a particular speaker. Example emotional states may include, but are not limited to, afraid, angry, annoyed, disgusted, distraught, glad, indignant, mild, plaintive, pleasant, pouting, sad or surprised. Example parameters that may be associated with each emotional state may include, but are not limited to, parameters relating to pitch (e.g., accent shape, average pitch, contour slope, final lowering, pitch range, reference line), timing (e.g., exaggeration, fluent pauses, hesitation pauses, speech rate, stress frequency), voice quality (e.g., breathiness, brilliance, laryngealization, loudness, pause discontinuity, pitch discontinuity, tremor), or articulation (e.g., precision). Numerous other approaches to modeling the expressive state of a speaker may be used as well.

Since each speech codec configuration $710_0$-$710_N$ includes its own state recognition module $724_0$-$724_N$, this module may operate in a speaker-dependent manner, taking into account user attributes associated with a particular speaker. For example, a state recognition module associated with a particular speech codec configuration may access a set of speaker-specific expressive states, wherein each expressive state is associated with one or more speaker-specific parameters that can be used to synthesize the speech of a particular speaker.

For each speech codec configuration $710_0$-$710_N$, synthesis module 726 operates to process both the stream of symbols, sym(n), produced by speech recognition module 722 and the expressive states, state(n), produced by state recognition module 724, to produce a reconstructed speech signal, s_out(n).

For each speech codec configuration $710_0$-$710_N$, combiner 728 computes the difference between the input speech signal and the reconstructed speech signal, s_out(n). This operation produces an error signal that is provided to compute deltas module 730. Compute deltas module 730 is used to refine the synthesis to account for any inaccuracies produced by other codec elements. Compute deltas module 730 computes deltas(n) which is then input to synthesis module 726. In one embodiment, deltas(n) is calculated using a closed-loop analysis-by-synthesis. For example, in a first iteration, synthesis module 726 uses sym(n) and state(n) along with the user attributes associated with a speaker to generate s_out(n), which as noted above comprises the reconstructed speech signal. The signal s_out(n) is compared to the input speech signal to generate the error signal e(n) which is input to compute deltas module 730 and used to compute deltas(n). In a next iteration, synthesis module 726 includes the deltas(n) to improve the synthesis quality. Note that e(n) may be an error signal in the speech (time) domain.

In an alternative implementation (not shown in FIG. 7), the output of synthesis module 726 may be an alternate representation of the input speech signal (e.g., synthesis model parameters, spectral domain representation, etc.). The input speech is transformed into an equivalent representation for error signal computation. Also note that compute deltas module 730 may also modify state(n) or sym(n) to correct for errors or improve the representation. Hence, the deltas(n) may represent a refinement of these parameters, or represent additional inputs to the synthesis model. For example, deltas(n) could simply be the quantized error signal.

During encoding, speech codec 700 produces and encodes state(n), deltas(n) and sym(n) information for each segment of the input speech signal. This information is transmitted to a decoder, which decodes the encoded information to produce state(n), deltas(n) and sym(n). Synthesis module 726 is used to process this information to produce the reconstructed speech signal s_out(n).

D. Environment-Dependent Speech Coding in Accordance with Embodiments of the Present Invention As described in preceding sections, a speech codec in accordance with an embodiment of the present invention can be configured or trained to operate in a speaker-dependent manner to improve coding efficiency. In accordance with a further embodiment, the speech codec may also be configured or trained to operate in an environment-dependent manner to improve coding efficiency. For example, an input condition associated with a communication terminal (e.g., clean, office, babble, reverberant hallway, airport, etc.) could be identified and then environment-dependent quantization tables or algorithms could be used during the encoding/decoding processes.

Figure 8:
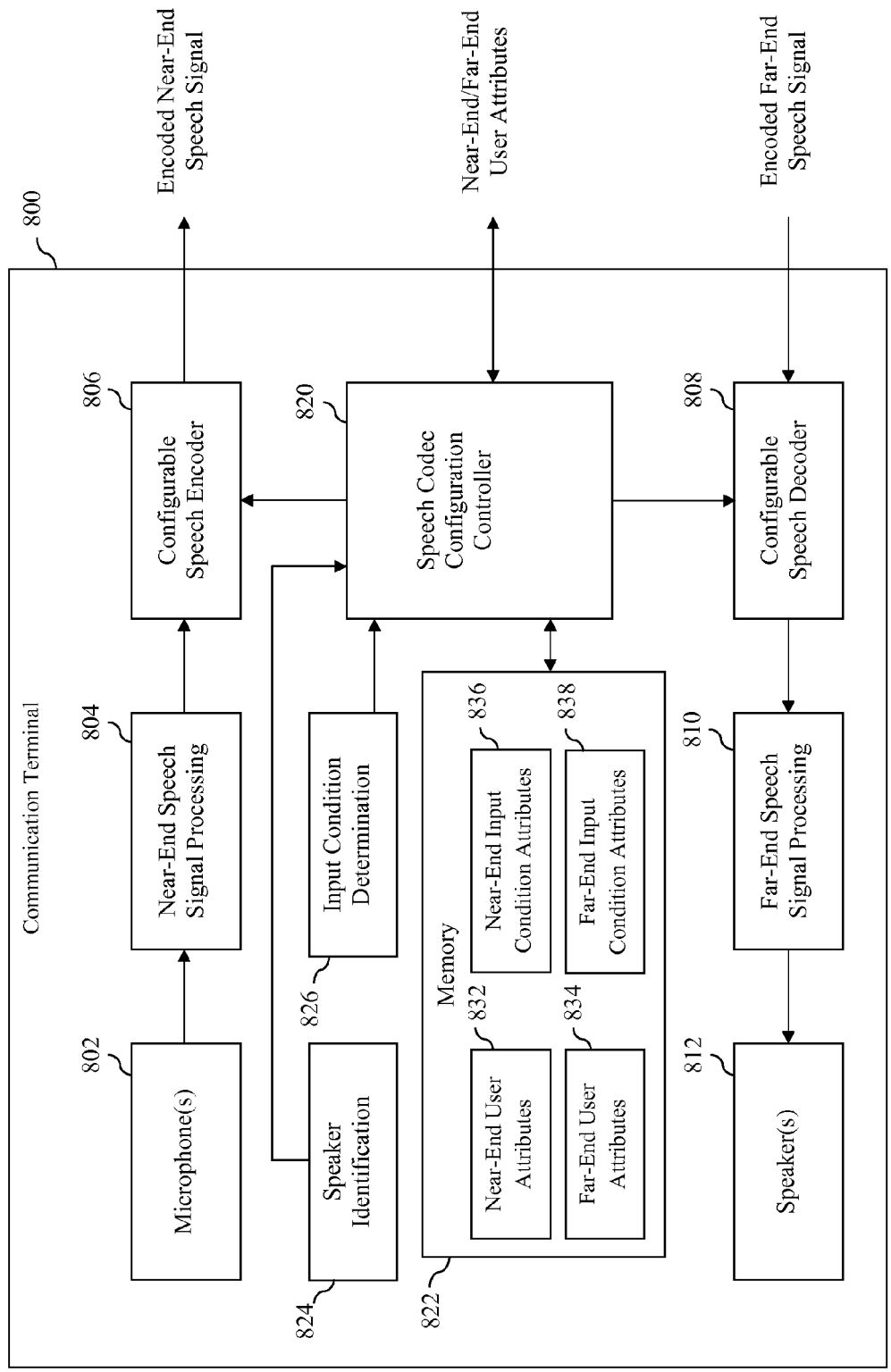
FIG. 8 is a block diagram of a communications terminal in accordance with an alternate embodiment of the present invention.

FIG. 8 depicts a block diagram of a communication terminal 800 in accordance with an alternate embodiment of the present invention that includes a speech codec that is configurable to operate in both a speaker-dependent and environment-dependent manner. As shown in FIG. 8, communication terminal 800 includes one or more microphones 802, a near-end speech signal processing module 804, a configurable speech encoder 806, a configurable speech decoder 808, a far-end speech signal processing module 810, one or more speakers 812, a speech codec configuration controller 820, a memory 822, a speaker identification module 824 and an input condition determination module 826.

Microphone(s) 802, near-end speech signal processing module 804, far-end speech signal processing module 810 and speaker(s) 812 generally operate in a like manner to microphone(s) 202, near-end speech signal processing module 204, far-end speech signal processing module 210 and speaker(s) 212, respectively, as described above in reference to communication terminal 200 of FIG. 2. Thus, for the sake of brevity, no further description of these elements will be provided.

Configurable speech encoder 806 operates to encode a digital near-end speech signal produced by near-end speech signal processing module 804 to generate an encoded near-end speech signal that is then transmitted to a remote communication terminal via a communications network. As will be further discussed below, the manner in which configurable speech encoder 806 performs the encoding process may be selectively modified by speech codec configuration controller 820 to take into account certain user attributes associated with the near-end speaker and certain attributes associated with a current near-end input condition to achieve a reduced coding bit rate.

Configurable speech decoder 808 operates to receive an encoded far-end speech signal from the communications network, wherein the encoded far-end speech signal represents the voice of a far-end speaker participating in a communication session with the near-end speaker. Configurable speech decoder 808 operates to decode the encoded far-end speech signal to produce a digital far-end speech signal suitable for processing by far-end speech signal processing module 810. As will be further discussed below, the manner in which configurable speech decoder 808 performs the decoding process may be selectively modified by speech codec configuration controller 820 to take into account certain user attributes associated with the far-end speaker and certain attributes associated with a current far-end input condition to achieve a reduced coding bit rate.

Speech codec configuration controller 820 comprises logic that selectively configures each of configurable speech encoder 806 and configurable speech decoder 808 to operate in a speaker-dependent and environment-dependent manner. In particular, speech codec configuration controller 820 selectively configures configurable speech encoder 206 to perform speech encoding in a manner that takes into account user attributes associated with a near-end speaker in a communication session and also takes into account attributes associated with a near-end input condition. Speech codec configuration controller 820 also selectively configures configurable speech decoder 808 to perform speech decoding in a manner that takes into account user attributes associated with a far-end speaker in the communication session and also takes into account attributes associated with a far-end input condition.

As shown in FIG. 8, the user attributes associated with the near-end speaker and the far-end speaker are stored in memory 822 on communication terminal 800 and are referred to, respectively, as near-end user attributes 832 and far-end user attributes 834. Depending upon the implementation, near-end user attributes 832 may be generated locally by communication terminal 800 or obtained from a remote entity via a network. As will be discussed subsequently herein, the obtaining or selection of the appropriate set of near-end user attributes may be facilitated by operations performed by speaker identification module 824. Far-end user attributes 834 are obtained from a remote entity via a network. Details regarding how and when communication terminal 800 obtains such user attributes will be provided elsewhere herein.

As further shown in FIG. 8, the attributes associated with the near-end input condition and the far-end input condition are also stored in memory 822 and are referred to, respectively, as near-end input condition attributes 836 and far-end input condition attributes 838. In certain implementations, the near-end and far-end input condition attributes are obtained from a remote entity via a network. As will be discussed subsequently herein, the obtaining or selection of the appropriate set of near-end input condition attributes may be facilitated by operations performed by input condition determination module 826. Details regarding how and when communication terminal 800 obtains such input condition attributes will be provided elsewhere herein.

Speech codec configuration controller 820 uses the user attributes to modify a configuration of configurable speech encoder 806 and/or configurable speech decoder 808 so that such entities operate in a speaker-dependent manner in a like manner to speech codec configuration controller 220 of communication terminal 200 as described above in reference to FIG. 2.

Speech codec configuration controller 820 also uses the input condition attributes to modify a configuration of configurable speech encoder 806 and/or configurable speech decoder 808 so that such entities operate in an environment-dependent manner. Modifying a configuration of configurable speech encoder 806 and/or configurable speech decoder 808 to operate in an environment-dependent manner may comprise, for example, replacing an environment-independent quantization table or codebook with an environment-dependent quantization table or codebook or replacing a first environment-dependent quantization table or codebook with a second environment-dependent quantization table or codebook. Modifying a configuration of configurable speech encoder 806 and/or configurable speech decoder 806 to operate in an environment-dependent manner may also comprise, for example, replacing an environment-independent encoding or decoding algorithm with an environment-dependent encoding or decoding algorithm or replacing a first environment-dependent encoding or decoding algorithm with a second environment-dependent encoding or decoding algorithm. Still other methods for modifying the configuration of configurable speech encoder 806 and/or configurable speech decoder 808 to cause those components to operate in an environment-dependent manner may be applied.

Figure 9:
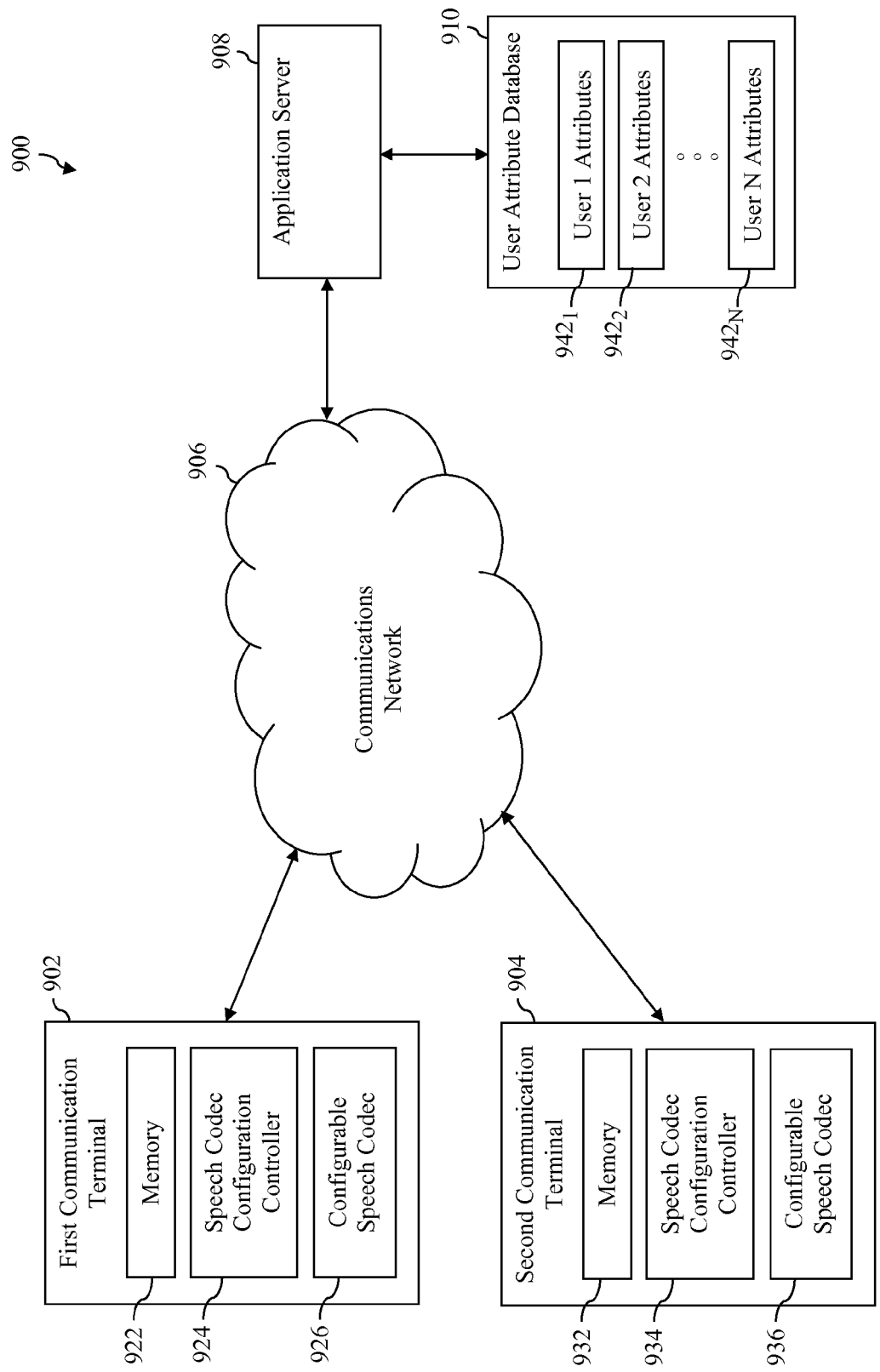
FIG. 9 is a block diagram of a communications system that implements network-assisted speech coding in accordance with an embodiment of the present invention.

E. Network-Assisted Speech Coding in Accordance with Embodiments of the Present Invention As discussed above, in accordance with various embodiments of the present invention, a communication terminal operates to configure a configurable speech codec to operate in a speaker-dependent manner based on user attributes in order to achieve improved coding efficiency. In certain embodiments, the user attributes for a populous of users are stored on a communications network and user attributes associated with certain users are selectively uploaded to certain communication terminals to facilitate a communication session there between. In this way, the communications network itself can be exploited to improve speech coding efficiency. FIG. 9 is a block diagram of an example communications system 900 that operates in such a manner.

As shown in FIG. 9, communications system 900 includes a first communication terminal 902 and a second communication terminal 904, each of which is communicatively connected to a communications network 906. Communications network 906 is intended to represent any network or combination of networks that is capable of supporting communication sessions between remotely-located communication terminals. Communications network 906 may comprise, for example, one or more of a cellular telecommunications network, a public switched telephone network (PSTN), an Internet Protocol (IP) network, or the like.

First communication terminal 902 includes a memory 922, a speech codec configuration controller 924 and a configurable speech codec 926. Memory 922 is configured to store certain user attribute information received via communications network 906, and speech codec configuration controller 924 is configured to retrieve the user attribute information stored in memory 922 and to use such information to configure configurable speech codec 926 to operate in a speaker-dependent manner. In one embodiment, first communication terminal 902 comprises a communication terminal such as communication terminal 200 of FIG. 2, in which case memory 922 is analogous to memory 222, speech codec configuration controller 924 is analogous to speech codec configuration controller 220 and configurable speech codec 926 is analogous to configurable speech encoder 206 and configurable speech decoder 208. In another embodiment, first communication terminal 902 comprises a communication terminal such as communication terminal 800 of FIG. 8, in which case memory 922 is analogous to memory 822, speech codec configuration controller 924 is analogous to speech codec configuration controller 820 and configurable speech codec 926 is analogous to configurable speech encoder 806 and configurable speech decoder 808. Various methods by which speech codec configuration controller 924 can use user attribute information to configure configurable speech codec 926 to operate in a speaker-dependent manner were described in preceding sections.

Similarly, second communication terminal 904 includes a memory 932, a speech codec configuration controller 934 and a configurable speech codec 936. Memory 932 is configured to store certain user attribute information received via communications network 906, and speech codec configuration controller 934 is configured to retrieve the user attribute information stored in memory 932 and to use such information to configure configurable speech codec 936 to operate in a speaker-dependent manner. In one embodiment, second communication terminal 904 comprises a communication terminal such as communication terminal 200 of FIG. 2, in which case memory 932 is analogous to memory 222, speech codec configuration controller 934 is analogous to speech codec configuration controller 220 and configurable speech codec 936 is analogous to configurable speech encoder 206 and configurable speech decoder 208. In another embodiment, second communication terminal 904 comprises a communication terminal such as communication terminal 800 of FIG. 8, in which case memory 932 is analogous to memory 822, speech codec configuration controller 934 is analogous to speech codec configuration controller 820 and configurable speech codec 936 is analogous to configurable speech encoder 806 and configurable speech decoder 808. Various methods by which speech codec configuration controller 934 can use user attribute information to configure configurable speech codec 936 to operate in a speaker-dependent manner were described in preceding sections.

As further shown in FIG. 9, an application server 908 is also communicatively connected to communications network 906 and to a user attribute database 910. User attribute database 910 stores sets of user attribute information $942_1$-$942_N$, wherein each set is associated with a corresponding user in a plurality of users. Application server 908 comprises a computing device or other hardware-implemented entity that selectively retrieves user attribute information from user attribute database 910 and uploads the retrieved user attribute information to one or both of first communication terminal 902 and second communication terminal 904 in a manner that will be described in more detail herein. Depending upon the implementation, user attribute database 910 may be stored in memory that is internal to application server 908 or in memory that is external to application server 908. Furthermore, user attribute database 910 may be stored in a storage system that is local with respect to application server 908 or remote with respect to application server 908 (e.g., that is connected to application server 908 via communications network 906). In an alternate embodiment, user attribute database 910 may be accessed by application server 908 via a database server (not shown in FIG. 9). It is further noted that, depending upon the implementation, the operations performed by application server 908 may be performed by a single server or by multiple servers.

Figure 10:
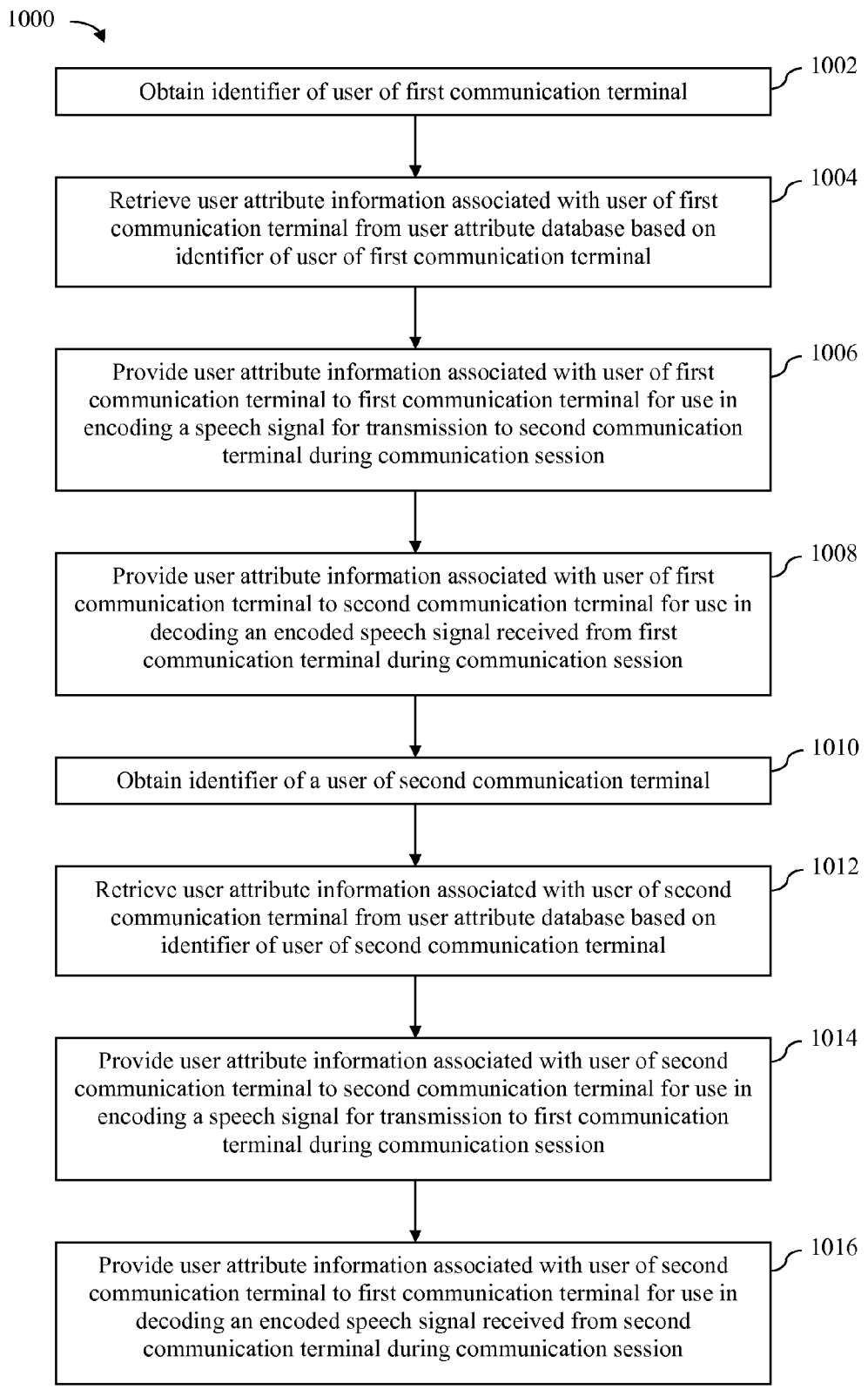
FIG. 10 depicts a flowchart of a method implemented by a server for facilitating speaker-dependent coding by a first communication terminal and a second communication terminal in accordance with an embodiment of the present invention.

FIG. 10 depicts a flowchart 1000 of a method implemented by application server 908 for facilitating speaker-dependent coding by first communication terminal 902 and second communication terminal 904 in accordance with an embodiment of the present invention. Although the method of flowchart 1000 will now be described in reference to various elements of communications system 900, it is to be understood that the method of flowchart 1000 may be performed by other entities and systems. It is also noted that the order of the steps of flowchart 1000 is not intended to suggest any temporal requirements and the steps may occur in an order other than that shown.

In one embodiment, the steps of flowchart 1000 are performed by application server 908 responsive to the initiation of a communication session between first communication terminal 902 and second communication terminal 904. For example, the steps of flowchart 1000 may be performed as a part of a set-up process that occurs during the establishment of a communication session between first communication terminal 902 and second communication terminal 904. The communication session may comprise, for example, a telephone call.

As shown in FIG. 10, the method of flowchart 1000 begins at step 1002 in which application server 908 obtains an identifier of a user of first communication terminal 902. The identifier may comprise one or more items of data that serve to uniquely identify the user of first communication terminal 902. As will be described below, first communication terminal 902 may determine the identity of the user of first communication terminal 902, select an identifier based on this process, and then provide the selected identifier to application server 908 via communications network 906. Alternatively, an entity residing on communications network 906 (operating alone or in conjunction with first communication terminal 902) may determine the identity of the user of first communication terminal 902, select an identifier based on this process, and then provide the selected identifier to application server 908. Still further, application server 908 (operating alone or in conjunction with first communication terminal 902) may itself identify the user of first communication terminal 902 and select an identifier accordingly.

At step 1004, application server 908 retrieves user attribute information associated with the user of first communication terminal 902 from user attribute database 910 based on the identifier of the user of first communication terminal 902. In one embodiment, the identifier of the user of first communication terminal 902 comprises a key or index that can be used to access the user attribute information associated with that user from user attribute database 910. The retrieved user attribute information may comprise any number of speaker-dependent characteristics associated with the user of first communication terminal 902 that relate to a speech model used by configurable speech codecs 924 and 934 implemented on first and second communication terminals 902 and 904, respectively. Specific examples of such user attributes were described in preceding sections.

At step 1006, application server 908 provides the user attribute information associated with the user of first communication terminal 902 to first communication terminal 902 for use in encoding a speech signal for transmission to second communication terminal 904 during a communication session. In one embodiment, the user attribute information associated with the user of first communication terminal 902 is used by speech codec configuration controller 924 to configure a speech encoder within configurable speech codec 926 to operate in a speaker-dependent fashion. For example, speech codec configuration controller 924 may configure the speech encoder to use at least one of a speaker-dependent quantization table or a speaker-dependent encoding algorithm that is selected based on the user attribute information associated with the user of first communication terminal 902.

At step 1008, application server 908 provides the user attribute information associated with the user of first communication terminal 902 to second communication terminal 904 for use in decoding an encoded speech signal received from first communication terminal 902 during the communication session. In one embodiment, the user attribute information associated with the user of first communication terminal 902 is used by speech codec configuration controller 934 to configure a speech decoder within configurable speech codec 936 to operate in a speaker-dependent fashion. For example, speech codec configuration controller 934 may configure the speech decoder to use at least one of a speaker-dependent quantization table or a speaker-dependent decoding algorithm that is selected based on the user attribute information associated with the user of first communication terminal 902.

At step 1010, application server 908 obtains an identifier of a user of second communication terminal 904. The identifier may comprise one or more items of data that serve to uniquely identify the user of second communication terminal 904. As will be described below, second communication terminal 904 may determine the identity of the user of second communication terminal 904, select an identifier based on this process, and then provide the selected identifier to application server 908 via communications network 906. Alternatively, an entity residing on communications network 906 (operating alone or in conjunction with second communication terminal 904) may determine the identity of the user of second communication terminal 904, select an identifier based on this process, and then provide the selected identifier to application server 908. Still further, application server 908 (operating alone or in conjunction with second communication terminal 904) may itself identify the user of second communication terminal 904 and select an identifier accordingly.

At step 1012, application server 908 retrieves user attribute information associated with the user of second communication terminal 904 from user attribute database 910 based on the identifier of the user of second communication terminal 904. In one embodiment, the identifier of the user of second communication terminal 904 comprises a key or index that can be used to access the user attribute information associated with that user from user attribute database 910. The retrieved user attribute information may comprise any number of speaker-dependent characteristics associated with the user of second communication terminal 904 that relate to a speech model used by configurable speech codecs 924 and 934 implemented on first and second communication terminals 902 and 904, respectively. Specific examples of such user attributes were described in preceding sections.

At step 1014, application server 908 provides the user attribute information associated with the user of second communication terminal 904 to second communication terminal 904 for use in encoding a speech signal for transmission to first communication terminal 902 during the communication session. In one embodiment, the user attribute information associated with the user of second communication terminal 904 is used by speech codec configuration controller 934 to configure a speech encoder within configurable speech codec 936 to operate in a speaker-dependent fashion. For example, speech codec configuration controller 934 may configure the speech encoder to use at least one of a speaker-dependent quantization table or a speaker-dependent encoding algorithm that is selected based on the user attribute information associated with the user of second communication terminal 904.

At step 1016, application server 908 provides user attribute information associated with the user of second communication terminal 904 to first communication terminal 902 for use in decoding an encoded speech signal received from second communication terminal 904 during the communication session. In one embodiment, the user attribute information associated with the user of second communication terminal 904 is used by speech codec configuration controller 934 to configure a speech decoder within configurable speech codec 936 to operate in a speaker-dependent fashion. For example, speech codec configuration controller 934 may configure the speech decoder to use at least one of a speaker-dependent quantization table or a speaker-dependent decoding algorithm that is selected based on the user attribute information associated with the user of second communication terminal 904.

As noted with respect to steps 1002 and 1010, the process of identifying a user of first communication terminal 902 or second communication terminal 904 may be carried out in several ways. In addition, the identification process may be performed by the communication terminal itself, by another entity on communications network 906 (including but not limited to application server 908), or by a combination of the communication terminal and an entity on communications network 906.

In accordance with one embodiment, each communication terminal is uniquely associated with a single user. That is to say, there is a one-to-one mapping between communication terminals and users. In this case, the user can be identified by simply identifying the communication terminal itself. This may be accomplished, for example, by transmitting a unique identifier of the communication terminal (e.g., a unique mobile device identifier, an IP address, or the like) from the communication terminal to application server 908.

In another embodiment, speaker identification is carried out by the communication terminal using non-speech-related means. In accordance with such an embodiment, the communication terminal may be able to identify a user before he/she speaks. For example, the communication terminal may include one or more sensors that operate to extract user features that can then be used to identify the user. These sensors may comprise, for example, tactile sensors that can be used to identify a user based on the manner in which he/she grasps the communication terminal, one or more visual sensors that can be used to identify a user based on images of the user captured by the visual sensors, or the like. In one embodiment, the extraction of non-speech-related features and identification based on such features is performed entirely by logic resident on the communication terminal. In an alternate embodiment, the extraction of non-speech-related features is performed by logic resident on the communication terminal and then the extracted features are sent to a network entity for use in identifying the user. For example, the network entity may compare the extracted non-speech-related features to a database that stores non-speech-related features associated with a plurality of network users to identify the user.

In a further embodiment, speaker identification is carried out by the communication terminal using speech-related means. In such an embodiment, the user cannot be identified until he/she speaks. For example, the communication terminal may include a speaker identification algorithm that is used to extract speaker features associated with a user when he/she speaks. The communication terminal may then compare the speaker features with a database of speaker features associated with frequent users of the communication terminal to identify the user. If the user cannot be identified, the speaker features may be sent to a network entity to identify the user. For example, the network entity may compare the extracted speaker features to a database that stores speaker features associated with a plurality of network users to identify the user. In accordance with such an embodiment, if the user does not speak until after the communication session has begun, the communication terminal will have to use a generic speech encoder. Once the speaker has been identified, the speech encoder can be configured to operate in a speaker-dependent (and thus more efficient) manner based on the user attributes associated with the identified user.

The user identification functions attributed to the communication terminal as the preceding discussion may be implemented by speaker identification module 224 of communication terminal 200 as described above in reference to FIG. 2 or by speaker identification module 824 of communication terminal 800 as described above in reference to FIG. 8.

Figure 11:
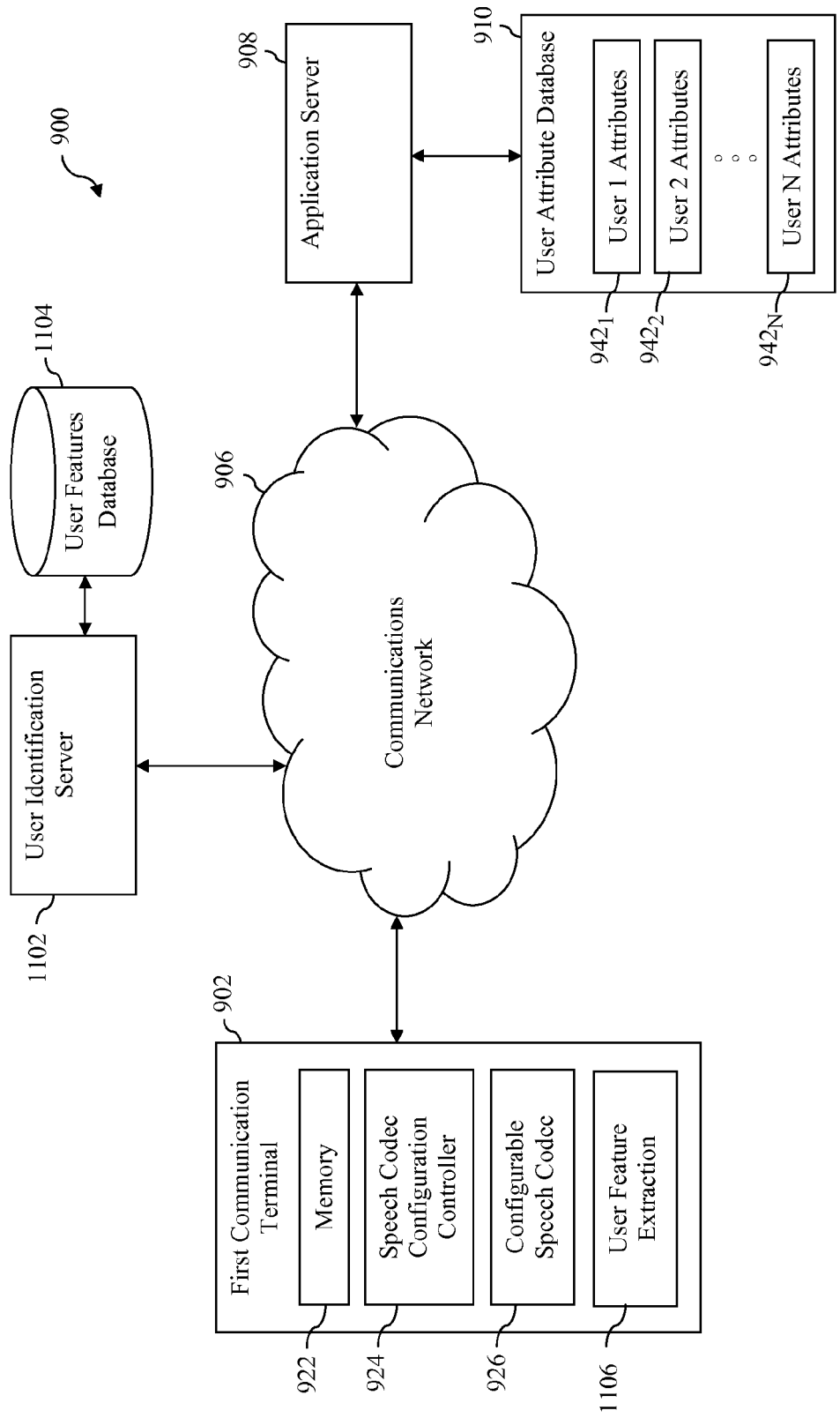
FIG. 11 is a block diagram of an embodiment of the communications system of FIG. 9 in which user identification is carried out both by a communication terminal and a user identification server.

FIG. 11 depicts a further embodiment of communications system 900 in which user identification is carried out both by communication terminal 902 and a user identification server 1102 connected to communications network 906. As shown in FIG. 10, communication terminal 902 includes a user feature extraction module 1106 that operates to obtain features associated with a user of first communication terminal 902. Such features may comprise non-speech related features such as features obtained by tactile sensors, visual sensors, or the like. Alternatively, such features may comprise speech-related features such as those obtained by any of a variety of well-known speaker recognition algorithms.

The features obtained by user feature extraction module 1106 are provided via communications network 906 to user identification server 1102. User identification server 1102 comprises a computing device or other hardware-implemented entity that compares the features received from communication terminal 902 to a plurality of feature sets associated with a corresponding plurality of network users that is stored in user features database 1104. If user identification server 1102 matches the features obtained from communication terminal 902 with a feature set associated with a particular network user in user features database 1104, the user is identified and an identifier associated with the user is sent to application server 908. In one embodiment, first communication terminal 902 first attempts to match the features obtained by user feature extraction module 1006 to an internal database of features associated with frequent users of first communication terminal 902 to determine the identity of the user. In accordance with such an embodiment, the features are only sent to user identification server if first communication terminal 902 is unable to identify the user.

Figure 12:
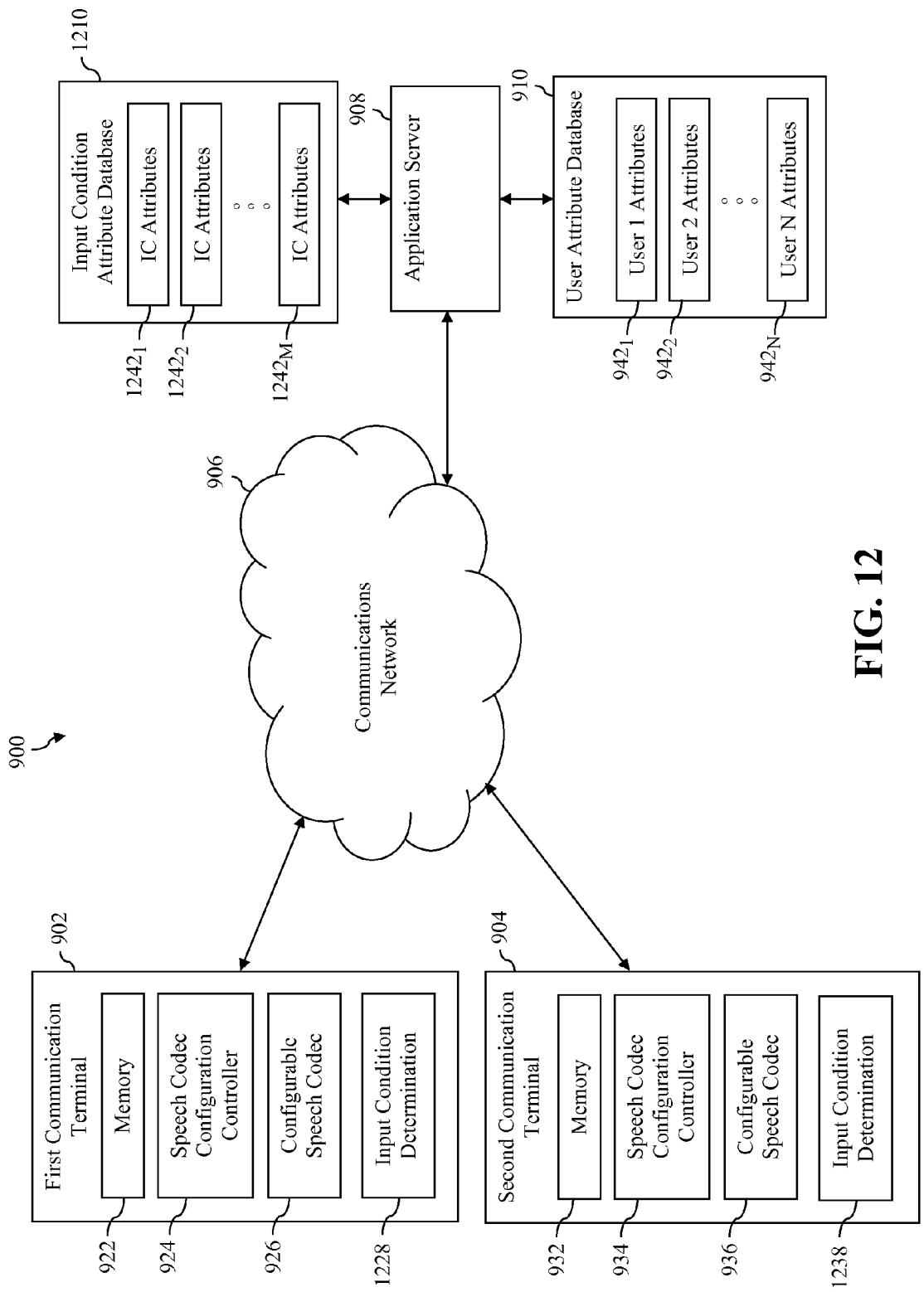
FIG. 12 is a block diagram of an embodiment of the communications system of FIG. 9 that facilitates the performance of environment-dependent coding by a first communication terminal and a second communication terminal.

FIG. 12 depicts a further embodiment of communications system 900 that facilitates the performance of environment-dependent coding by first communication terminal 902 and second communication terminal 904. In accordance with the embodiment shown in FIG. 12, first communication terminal 902 includes an input condition determination module 1228 that is capable of determining a current input condition associated with first communication terminal 902 or the environment in which first communication terminal 902 is operating. For example, depending upon the implementation, the input condition may comprise one or more of "clean," "office," "babble," "reverberant," "hallway," "airport," "driving," or the like. Input condition determination module 1228 may operate, for example, by analyzing the audio signal captured by one or more microphones of first communication terminal 902 to determine the current input condition. First communication terminal 902 transmits information concerning the current input condition associated therewith to application server 908.

As shown in FIG. 12, application server 908 is communicatively coupled to an input condition attribute database 1210. Input condition attribute database 1210 stores a plurality of input condition (IC) attributes $1242_1$-$1242_M$, each of which corresponds to a different input condition. When application server 908 receives the current input condition information from first communication terminal 902, application server 908 selects one of IC attributes $1242_1$-$1242_M$ that corresponds to the current input condition and transmits the selected IC attributes to first communication terminal 902 and second communication terminal 904. At first communication terminal 902, speech codec configuration controller 924 uses the selected IC attributes to configure the speech encoder within configurable speech codec 926 to operate in an environment-dependent fashion when encoding a speech signal for transmission to second communication terminal 904. For example, speech codec configuration controller 924 may configure the speech encoder to use at least one of an environment-dependent quantization table or an environment-dependent encoding algorithm that is selected based on the IC attributes received from application server 908. At second communication terminal 904, speech codec configuration controller 934 uses the selected IC attributes to configure the speech decoder within configurable speech coder 936 to operate in an environment-dependent fashion when decoding the encoded speech signal received from first communication terminal 902. For example, speech codec configuration controller 934 may configure the speech decoder to use at least one of an environment-dependent quantization table or an environment-dependent decoding algorithm that is selected based on the IC attributes received from application server 908.

In further accordance with the embodiment shown in FIG. 12, second communication terminal 904 includes an input condition determination module 1238 that is capable of determining a current input condition associated with second communication terminal 904 or the environment in which second communication terminal 904 is operating. Input condition determination module 1238 may operate, for example, by analyzing the audio signal captured by one or more microphones of second communication terminal 904 to determine the current input condition. Second communication terminal 904 transmits information concerning the current input condition associated therewith to application server 908.

When application server 908 receives the current input condition information from second communication terminal 904, application server 908 selects one of IC attributes $1242_1$-$1242_M$ that corresponds to the current input condition and transmits the selected IC attributes to first communication terminal 902 and second communication terminal 904. At first communication terminal 902, speech codec configuration controller 924 uses the selected IC attributes to configure the speech decoder within configurable speech codec 926 to operate in an environment-dependent fashion when decoding an encoded speech signal received from second communication terminal 904. For example, speech codec configuration controller 924 may configure the speech decoder to use at least one of an environment-dependent quantization table or an environment-dependent decoding algorithm that is selected based on the IC attributes received from application server 908. At second communication terminal 904, speech codec configuration controller 934 uses the selected IC attributes to configure the speech encoder within configurable speech coder 936 to operate in an environment-dependent fashion when encoding a speech signal for transmission to first communication terminal 902. For example, speech codec configuration controller 934 may configure the speech encoder to use at least one of an environment-dependent quantization table or an environment-dependent encoding algorithm that is selected based on the IC attributes received from application server 908.

Although application server 908 is described in reference to FIG. 12 as performing functions related to selecting and distributing user attribute information and selecting and distributing IC attribute information, it is to be understood that these functions may be performed by two different servers, or more than two servers.

Figure 13:
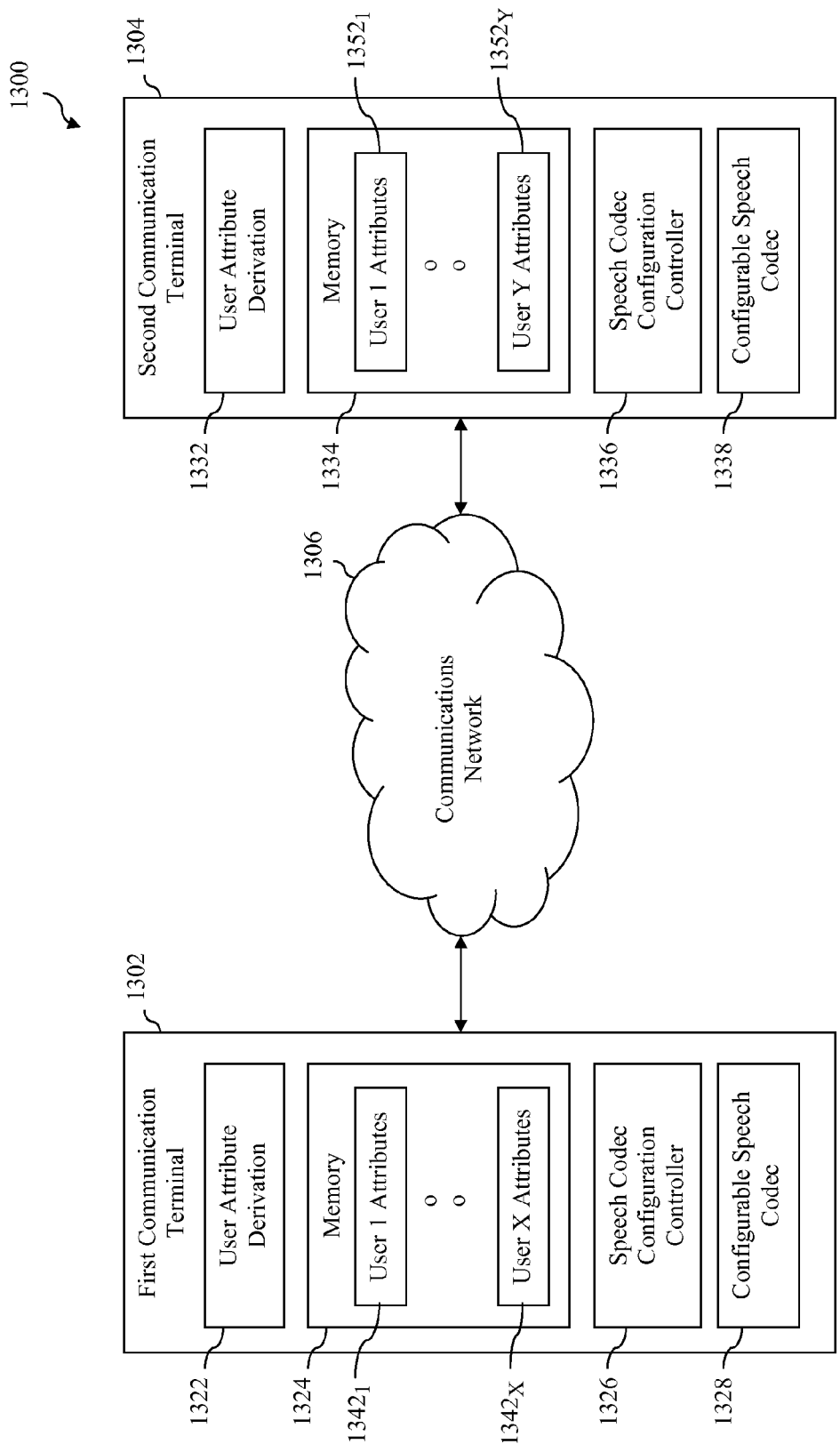
FIG. 13 is a block diagram of a communications system that implements peer-assisted speech coding in accordance with an embodiment of the present invention.

F. Peer-Assisted Speech Coding in Accordance with Embodiments of the Present Invention As discussed above, in accordance with various embodiments of the present invention, a communication terminal operates to configure a configurable speech codec to operate in a speaker-dependent manner based on user attributes in order to achieve improved coding efficiency. In certain embodiments, the user attributes associated with a user of a particular communication terminal are stored on the communication terminal and then shared with another communication terminal prior to or during a communication session between the two terminals in order to improve speech coding efficiency. FIG. 13 is a block diagram of an example communications system 1300 that operates in such a manner.

As shown in FIG. 13, communications system 1300 includes a first communication terminal 1302 and a second communication terminal 1304, each of which is communicatively connected to a communications network 1306. Communications network 1306 is intended to represent any network or combination of networks that is capable of supporting communication sessions between remotely-located communication terminals. Communications network 1306 may comprise, for example, one or more of a cellular telecommunications network, a public switched telephone network (PSTN), an Internet Protocol (IP) network, or the like.

First communication terminal 1302 includes a user attribute derivation module 1322, a memory 1324, a speech codec configuration controller 1326 and a configurable speech codec 1328. User attribute derivation module 1322 is configured to process speech signals originating from one or more users of first communication terminal 1302 and derive user attribute information there from. Memory 1324 is configured to store the user attribute information derived by user attribute derivation module 1322. As shown in FIG. 13, such user attribute information includes a plurality of user attributes $1342_1$-$1342_X$, each of which is associated with a different user of first communication terminal 1302. For example, user attributes $1342_1$-$1342_X$ may comprise user attribute information associated with the most frequent users of first communication terminal 1302 or the most recent users of first communication terminal 1302. Memory 1324 is also configured to store user attribute information received from second communication terminal 1304 in a manner to be described in more detail herein. Speech codec configuration controller 1326 is configured to retrieve user attribute information stored in memory 1324 and to use such information to configure configurable speech codec 1328 to operate in a speaker-dependent manner.

In one embodiment, first communication terminal 1302 comprises a communication terminal such as communication terminal 200 of FIG. 2, in which case memory 1324 is analogous to memory 222, speech codec configuration controller 1326 is analogous to speech codec configuration controller 220 and configurable speech codec 1328 is analogous to configurable speech encoder 206 and configurable speech decoder 208. In another embodiment, first communication terminal 1302 comprises a communication terminal such as communication terminal 800 of FIG. 8, in which case memory 1324 is analogous to memory 822, speech codec configuration controller 1326 is analogous to speech codec configuration controller 820 and configurable speech codec 1328 is analogous to configurable speech encoder 806 and configurable speech decoder 808. Various methods by which speech codec configuration controller 1326 can use user attribute information to configure configurable speech codec 1328 to operate in a speaker-dependent manner were described in preceding sections.

As further shown in FIG. 13, second communication terminal 1304 includes a user attribute derivation module 1332, a memory 1334, a speech codec configuration controller 1336 and a configurable speech codec 1338. User attribute derivation module 1332 is configured to process speech signals originating from one or more users of second communication terminal 1304 and derive user attribute information there from. Memory 1334 is configured to store the user attribute information derived by user attribute derivation module 1332. Such user attribute information includes a plurality of user attributes $1352_1$-$1352_Y$, each of which is associated with a different user of second communication terminal 1304. For example, user attributes $1352_1$-$1352_Y$ may comprise user attribute information associated with the most frequent users of second communication terminal 1304 or the most recent users of second communication terminal 1304. Memory 1334 is also configured to store user attribute information received from first communication terminal 1304 in a manner to be described in more detail herein. Speech codec configuration controller 1336 is configured to retrieve user attribute information stored in memory 1334 and to use such information to configure configurable speech codec 1338 to operate in a speaker-dependent manner.

In one embodiment, second communication terminal 1304 comprises a communication terminal such as communication terminal 200 of FIG. 2, in which case memory 1334 is analogous to memory 222, speech codec configuration controller 1336 is analogous to speech codec configuration controller 220 and configurable speech codec 1338 is analogous to configurable speech encoder 206 and configurable speech decoder 208. In another embodiment, second communication terminal 1304 comprises a communication terminal such as communication terminal 800 of FIG. 8, in which case memory 1334 is analogous to memory 822, speech codec configuration controller 1336 is analogous to speech codec configuration controller 820 and configurable speech codec 1338 is analogous to configurable speech encoder 806 and configurable speech decoder 808. Various methods by which speech codec configuration controller 1336 can use user attribute information to configure configurable speech codec 1338 to operate in a speaker-dependent manner were described in preceding sections.

Figure 14:
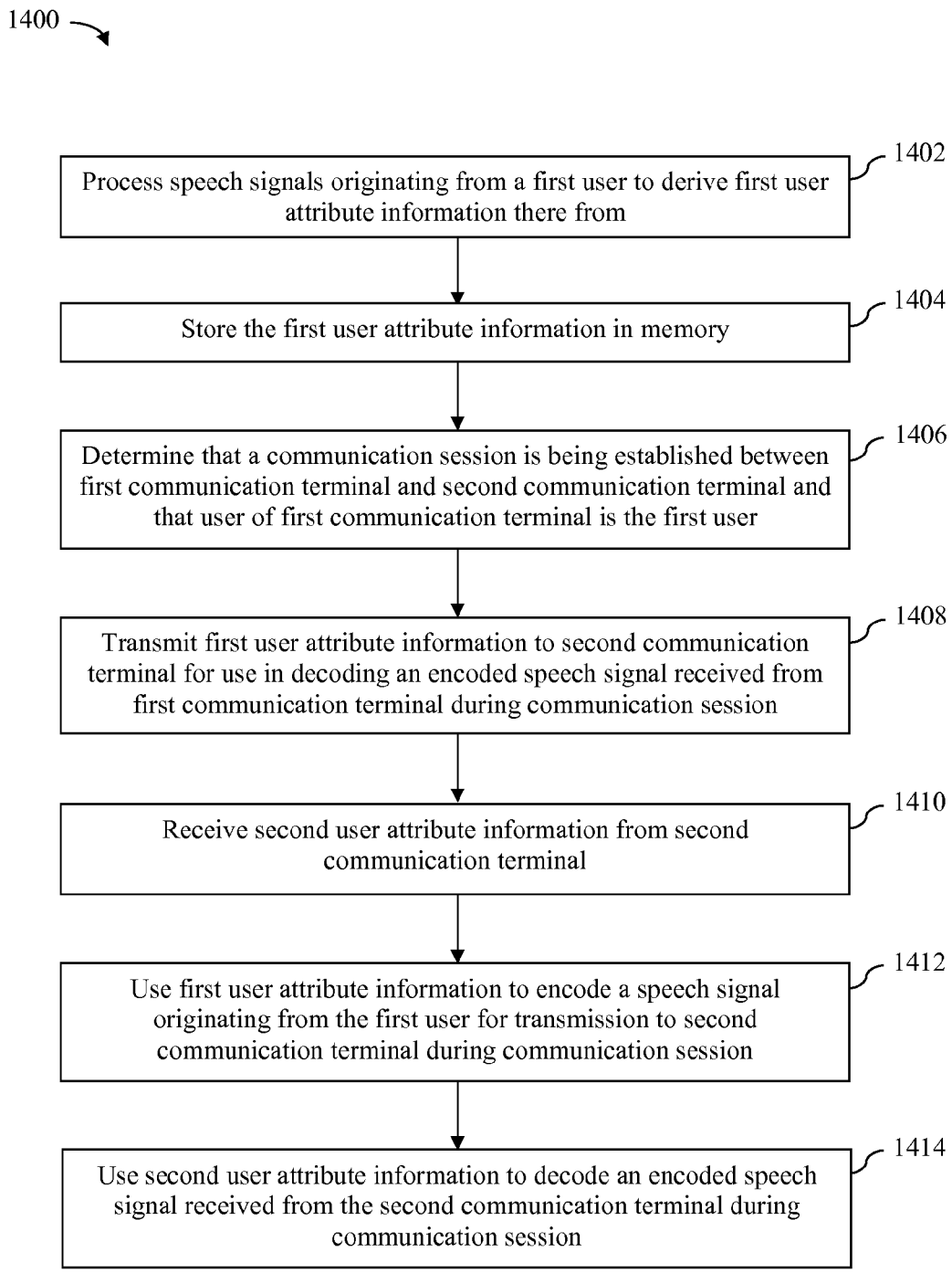
FIG. 14 depicts a flowchart of a method implemented by a communication terminal for facilitating speaker-dependent coding in accordance with an embodiment of the present invention.

FIG. 14 depicts a flowchart 1400 of a method that may be implemented by either first communication terminal 1302 or second communication terminal 1304 to facilitate speaker-dependent coding by both communication terminals in accordance with an embodiment of the present invention. The method will be described as steps implemented by first communication terminal 1302. However, the method could likewise be implemented by second communication terminal 1034. Furthermore, although the method will be described in reference to various elements of communications system 1300, it is to be understood that the method of flowchart 1400 may be performed by other entities and systems. It is also noted that the order of the steps of flowchart 1400 is not intended to suggest any temporal requirements and the steps may occur in an order other than that shown.

As shown in FIG. 14, the method of flowchart 1400 begins at step 1402 in which user attribute derivation module 1322 processes speech signals originating from a first user of first communication terminal 1302 to derive first user attribute information there from. Deriving the first user attribute information may comprise generating new first user attribute information or updating existing first user attribute information. Additional details regarding the manner by which user attribute derivation module 1322 originally derives such user attribute information, as well as updates such user attribute information, will be provided herein.

At step 1404, user attribute derivation module 1322 stores the first user attribute information derived during step 1402 in memory 1324. In an embodiment, the first user attribute information is stored along with a unique identifier of the first user.

At step 1406, first communication terminal 1302 determines that a communication session is being established between first communication terminal 1302 and second communication terminal 1304. During this step, first communication terminal 1302 also determines that the current user of first communication terminal 1302 is the first user. As will be described below, an embodiment of first communication terminal 1302 includes logic for determining the identity of the current user thereof. Responsive to determining that a communication session is being established between first communication terminal 1302 and second communication terminal 1304 and that the current user of first communication terminal 1302 is the first user, steps 1408, 1410, 1412 and 1414 are performed.

At step 1408, speech codec configuration controller 1302 retrieves the first user attribute information from memory 1324 and transmits a copy thereof to second communication terminal 1304 for use in decoding an encoded speech signal received from first communication terminal 1302 during the communication session. The first user attributes may be retrieved by searching for user attributes associated with a unique identifier of the first user. In one embodiment, the first user attribute information is used by speech codec configuration controller 1336 within second communication terminal 1304 to configure a speech decoder within configurable speech codec 1338 to operate in a speaker-dependent fashion. For example, speech codec configuration controller 1336 may configure the speech decoder to use at least one of a speaker-dependent quantization table or a speaker-dependent decoding algorithm that is selected based on the first user attribute information.

At step 1410, first communication terminal 1302 receives second user attribute information from second communication terminal 1304 via communications network 1306. The second user attribute information represents user attribute information associated with a current user of second communication terminal 1304.

At step 1412, first communication terminal 1302 uses the first attribute information to encode a speech signal originating from the first user for transmission to second communication terminal 1304 during the communication session. In one embodiment, the first user attribute information is used by speech codec configuration controller 1326 to configure a speech encoder within configurable speech codec 1328 to operate in a speaker-dependent fashion. For example, speech codec configuration controller 1326 may configure the speech encoder to use at least one of a speaker-dependent quantization table or a speaker-dependent encoding algorithm that is selected based on the first user attribute information.

At step 1414, first communication terminal 1302 uses the second attribute information to decode an encoded speech signal received from second communication terminal 1304 during the communication session. In one embodiment, the second user attribute information is used by speech codec configuration controller 1326 to configure a speech decoder within configurable speech codec 1328 to operate in a speaker-dependent fashion. For example, speech codec configuration controller 1326 may configure the speech decoder to use at least one of a speaker-dependent quantization table or a speaker-dependent decoding algorithm that is selected based on the second user attribute information.

In accordance with the foregoing method, two communication terminals (such as communication terminals 1302 and 1304) can each obtain access to locally-stored user attribute information associated with a current user thereof and can also exchange copies of such user attribute information with the other terminal, so that speaker-dependent encoding and decoding can advantageously be implemented by both terminals when a communication session is established there between. If each communication terminal is capable of identifying the current user thereof before the communication session is actually initiated, the user attribute information can be exchanged during a communication session set-up process. Hence, once the communication session is actually initiated, each communication terminal will have the locally-stored user attributes of the near end user as well as the user attributes of the far end user.

The user identification process may be carried out by each terminal using any of the speech-related or non-speech related means for identifying a user of a communication terminal described in the preceding section dealing with network-assisted speech coding. In an embodiment in which first communication terminal 1302 and second communication terminal 1304 each comprise a communication terminal such as communication terminal 200 of FIG. 2, the user identification functions may be implemented by speaker identification module 224 of communication terminal 200 as described above in reference to FIG. 2. In an embodiment in which first communication terminal 1302 and second communication terminal 1304 each comprise a communication terminal such as communication terminal 800 of FIG. 8, the user identification functions may be implemented by speaker identification module 824 of communication terminal 800 as described above in reference to FIG. 8.

Figure 15:
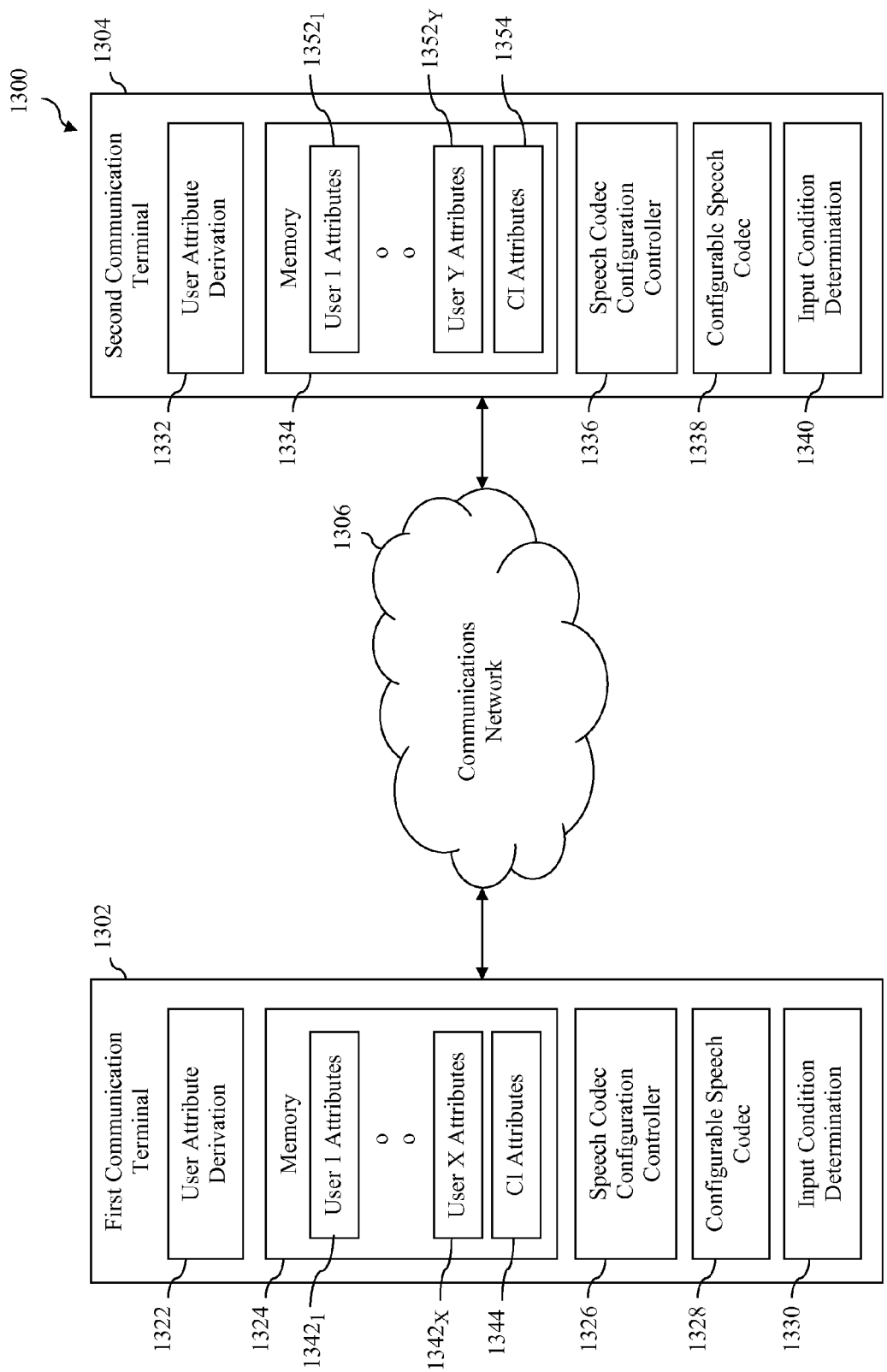
FIG. 15 depicts a further embodiment of the communications system of FIG. 13 that facilitates the performance of environment-dependent coding by a first communication terminal and a second communication terminal.

FIG. 15 depicts a further embodiment of communications system 1300 that facilitates the performance of environment-dependent coding by first communication terminal 1302 and second communication terminal 1304. In accordance with the embodiment shown in FIG. 15, first communication terminal 1302 includes an input condition determination module 1330 that is capable of determining a current input condition associated with first communication terminal 1302 or the environment in which first communication terminal 1302 is operating. For example, depending upon the implementation, the input condition may comprise one or more of "clean," "office," "babble," "reverberant," "hallway," "airport," "driving," or the like. Input condition determination module 1330 may operate, for example, by analyzing the audio signal captured by one or more microphones of first communication terminal 1302 to determine the current input condition.

During the establishment of a communication session between first communication terminal 1302 and second communication 1304, first communication terminal 1302 transmits information concerning the current input condition associated therewith to second communication terminal 1304. In a like manner, input condition determination module 1340 operating on second communication terminal 1304 determines a current input condition associated with second communication terminal 1304 and transmits information concerning the current input condition associated therewith to first communication terminal 1302.

As shown in FIG. 15, first communication terminal 1302 stores a plurality of input condition (IC) attributes 1344 in memory 1324 and second communication terminal 1304 stores a like plurality of IC attributes 1354 in memory 1334. Since each communication terminal is capable of determining its own input condition, each terminal can access IC attributes associated with its own input condition and then configure its own speech encoder to operate in an environment-dependent manner.

For example, speech codec configuration controller 1326 of first communication terminal 1302 can use the IC attributes associated with the current input condition of first communication terminal 1302 to configure the speech encoder within configurable speech codec 1328 to operate in an environment-dependent fashion when encoding a speech signal for transmission to second communication terminal 1304. For example, speech codec configuration controller 1326 may configure the speech encoder to use at least one of an environment-dependent quantization table or an environment-dependent encoding algorithm that is selected based on the IC attributes associated with the current input condition of first communication terminal 1302.

Furthermore, speech codec configuration controller 1336 of second communication terminal 1304 can use the IC attributes associated with the current input condition of second communication terminal 1304 to configure the speech encoder within configurable speech codec 1338 to operate in an environment-dependent fashion when encoding a speech signal for transmission to first communication terminal 1302. For example, speech codec configuration controller 1336 may configure the speech encoder to use at least one of an environment-dependent quantization table or an environment-dependent encoding algorithm that is selected based on the IC attributes associated with the current input condition of second communication terminal 1304.

In further accordance with the embodiment shown in FIG. 15, since each communication terminal receives information concerning the current input condition of the other terminal, each terminal can access IC attributes associated with the current input condition of the other terminal and then configure its own speech decoder to operate in an environment-dependent manner.

For example, speech codec configuration controller 1326 of first communication terminal 1302 can use the IC attributes associated with the current input condition of second communication terminal 1304 to configure the speech decoder within configurable speech codec 1328 to operate in an environment-dependent fashion when decoding an encoded speech signal received from second communication terminal 1304. For example, speech codec configuration controller 1326 may configure the speech decoder to use at least one of an environment-dependent quantization table or an environment-dependent decoding algorithm that is selected based on the IC attributes associated with the current input condition of second communication terminal 1304.

Furthermore, speech codec configuration controller 1336 of second communication terminal 1304 can use the IC attributes associated with the current input condition of first communication terminal 1302 to configure the speech decoder within configurable speech codec 1338 to operate in an environment-dependent fashion when decoding an encoded speech signal received from first communication terminal 1302. For example, speech codec configuration controller 1336 may configure the speech decoder to use at least one of an environment-dependent quantization table or an environment-dependent encoding algorithm that is selected based on the IC attributes associated with the current input condition of first communication terminal 1302.

G. User Attribute Generation and Distribution in Accordance with Embodiments of the Present Invention In each of the network-assisted and peer-assisted speech coding approaches discussed above, user attributes associated with different users are selectively accessed and utilized to configure a configurable speech codec to operate in a speaker-dependent manner. The generation of the user attributes may be performed in a variety of ways. In one embodiment, the user attributes associated with a particular user are generated by components operating on a communication terminal that is owned or otherwise utilized by the particular user. A block diagram of an example communication terminal in accordance with such an embodiment is shown in FIG. 16.

Figure 16:
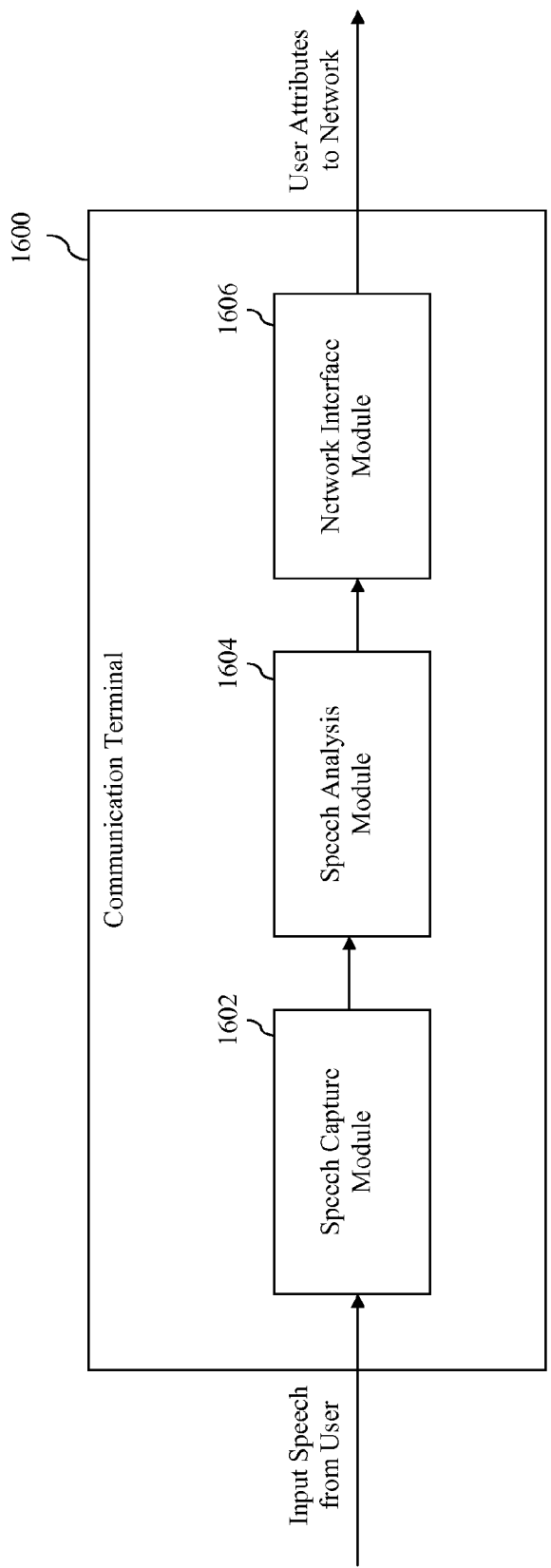
FIG. 16 is a block diagram of a communication terminal that generates user attribute information in accordance with an embodiment of the present invention.

In particular, FIG. 16 is a block diagram of a communication terminal 1600 that includes a speech capture module 1602, a speech analysis module 1604 and a network interface module 1606. In accordance with certain embodiments, communication terminal 1600 comprises a particular implementation of communication terminal 200 of FIG. 2 or communication terminal 800 of FIG. 8. Alternatively, communication terminal 1600 may comprise a different communication terminal than those previously described.

Speech capture module 1602 comprises a component that operates to capture a speech signal of a user of a communication terminal. For example, with reference to communication terminal 200 of FIG. 2, speech capture module 1602 may comprise microphone(s) 202 or microphone(s) 202 operating in conjunction with near-end speech signal processing module 204. Since speech capture module 1602 is located on communication terminal 1600, it can advantageously capture the speech signal for processing prior to encoding. Speech capture module 1602 may capture the speech signal of the user of communication terminal 1600 when the user is using communication terminal 1600 to conduct a communication session. Alternatively or additionally, speech capture module 1602 may capture the speech signal of the user of communication terminal 1600 when the user has caused communication terminal 1600 to operate in a training mode.

Speech analysis module 1604 comprises a component that processes the speech signal captured by speech capture module 1602 to generate user attribute information associated with the user of communication terminal 1600 or to update existing user attribute information associated with the user of communication terminal 1600. As noted above, such user attribute information may comprise any speaker-dependent characteristics associated with the user of communication terminal 1600 that relate to a model used by a configurable speech codec for coding speech. The user attribute information that is generated and/or updated by speech analysis module 1604 is stored in memory on communication terminal 1600.

Network interface module 1606 comprises a component that transmits the user attribute information generated or updated by speech analysis module 1604 to a network for the purpose of making the user attribute information available to other communication terminals for use in configuring a configurable speech codec of each of the other communication terminals to operate in a speaker-dependent manner. In a network-assisted speech coding scenario such as that previously described in reference to communication systems 900 of FIG. 9, network interface module 1606 may transmit the user attribute information to an application server residing on a network, such as application server 908, for storage and subsequent retrieval from a user attribute database, such as user attribute database 910. In a peer-assisted speech coding scenario such as that previously described in reference to communications system 1300, network interface module 1606 may be configured to transmit the user attribute information directly to another communication terminal that is communicatively coupled to the network.

Figure 17:
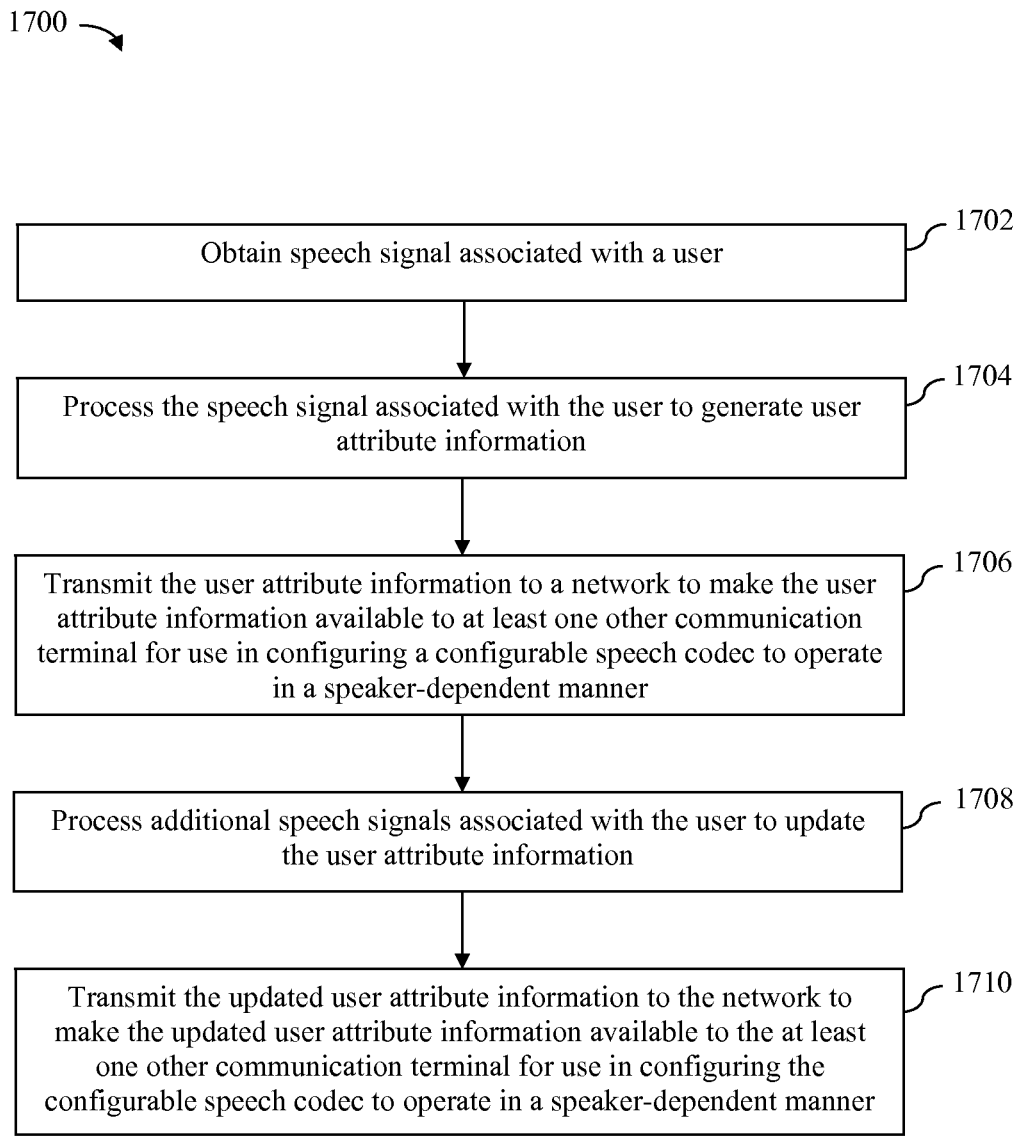
FIG. 17 depicts a flowchart of a method performed by a communication terminal for generating and sharing user attribute information in accordance with an embodiment of the present invention.

FIG. 17 depicts a flowchart 1700 of a method performed by a communication terminal for generating and sharing user attribute information in accordance with an embodiment of the present invention. For the purposes of illustration only, the method of flowchart 1700 will now be described in reference to components of communication terminal 1600 of FIG. 6. However, persons skilled in the relevant art(s) will readily appreciate that the method of flowchart 1700 may be performed by other components and/or communication terminals.

As shown in FIG. 17, the method of flowchart 1700 begins at step 1702 in which speech capture module 1602 obtains a speech signal associated with a user. As noted above, the speech signal may be obtained when the user is using communication terminal 1600 to conduct a communication session. Alternatively, the speech signal may be obtained when the user is operating the communication terminal in a training mode.

At step 1704, speech analysis module 1604 processes the speech signal associated with the user to generate user attribute information associated with the user, which is stored in local memory on communications terminal 1600. The user attribute information may comprise any speaker-dependent characteristics associated with the user that relate to a model used by a configurable speech codec for coding speech. For example, where the configurable speech codec is a configurable analysis-by-synthesis speech codec, the user attribute information may comprise information associated with at least one of a vocal tract of the user, a pitch or pitch range of the user, and an excitation signal (including excitation shape and/or gain) associated with the user. As a further example, where the configurable speech codec is a configurable speech codec that separately encodes/decodes speaker-independent and speaker-dependent components of a speech signal, the user attribute information may comprise information useful to transform a linguistic symbolic representation of speech content into spoken speech. Such information may include for example, information relating to a pitch of the user (e.g., accent shape, average pitch, contour slope, final lowering, pitch range and reference line), information relating to a timing of the user (e.g., exaggeration, fluent pauses, hesitation pauses, speech rate and stress frequency), information relating to a voice quality of the user (e.g., breathiness, brilliance, laryngealization, loudness, pause discontinuity, pitch discontinuity, tremor) and information relating to an articulation of the user (e.g., precision). However, these are merely examples, and various other types of user attribute information may be generated during step 1704.

At step 1706, network interface module 1606 transmits the user attribute information to a network to make the user attribute information available to at least one other communication terminal for use in configuring a configurable speech codec to operate in a speaker-dependent manner. As noted above, this step may comprise transmitting the user attribute information to a server that stores the user attribute information for subsequent transmission to the at least one other communication terminal or transmitting the user attribute information directly to the at least one other communication terminal via the network.

At step 1708, speech analysis module 1604 processes additional speech signals associated with the user that are obtained by speech capture module 1602 to update the user attribute information associated with the user. Such updating may be performed, for example, to improve or refine the quality of the user attribute information over time and/or to adapt to changes in the voice of the user. At step 1710, network interface module 1606 transmits the updated user attribute information to the network to make the updated user attribute information available to the at least one other communication terminal for use in configuring the configurable speech codec to operate in a speaker-dependent manner.

The frequency at which the user attribute information is updated and transmitted to the network may vary depending upon the implementation. For example, in one embodiment, additional speech signals associated with the user are processed by speech analysis module 1604 to update the user attribute information associated with the user each time the user uses communication terminal 1600 to conduct a communication session. In another embodiment, the additional speech signals associated with the user are processed by speech analysis module 1604 to update the user attribute information associated with the user on a periodic basis. For example, the additional speech signals associated with the user may be processed by speech analysis module 1604 to update the user attribute information associated with the user every time a predetermined interval of time has passed or after a predetermined number of communication sessions have been conducted. The frequency at which network interface module 1606 transmits the updated user attribute information to the network may be the same as or different from the frequency at which such user attribute information is updated.

Sending updated user attribute information to the network may comprise sending an entirely new set of user attribute information or sending only information representing differences between the updated user attribute information and previously-transmitted user attribute information. The differences may be transmitted, for example, by transmitting only the absolute value of those attributes that have changed or by transmitting delta values that represent the difference between updated attribute values and previously-transmitted attribute values, In certain embodiments, speech analysis module 1604 processes additional speech signals associated with the user that are obtained by speech capture module 1602 to determine whether locally-stored user attribute information for the user is up-to-date. If the locally-stored user attribute information is deemed up-to-date, then speech analysis module 1604 will not generate updated user attribute information. However, if the locally-stored user attribute information is deemed out-of-date, then speech analysis module 1604 will generate updated user attribute information. In one implementation, speech analysis module 1604 periodically updates a locally-stored copy of the user attribute information for a user but does not transmit the updated locally-stored copy of the user attribute information to the network until it is determined that a measure of differences between the updated locally-stored copy of the user attribute information and a previously-transmitted copy of the user attribute information exceeds some threshold.

Figure 18:
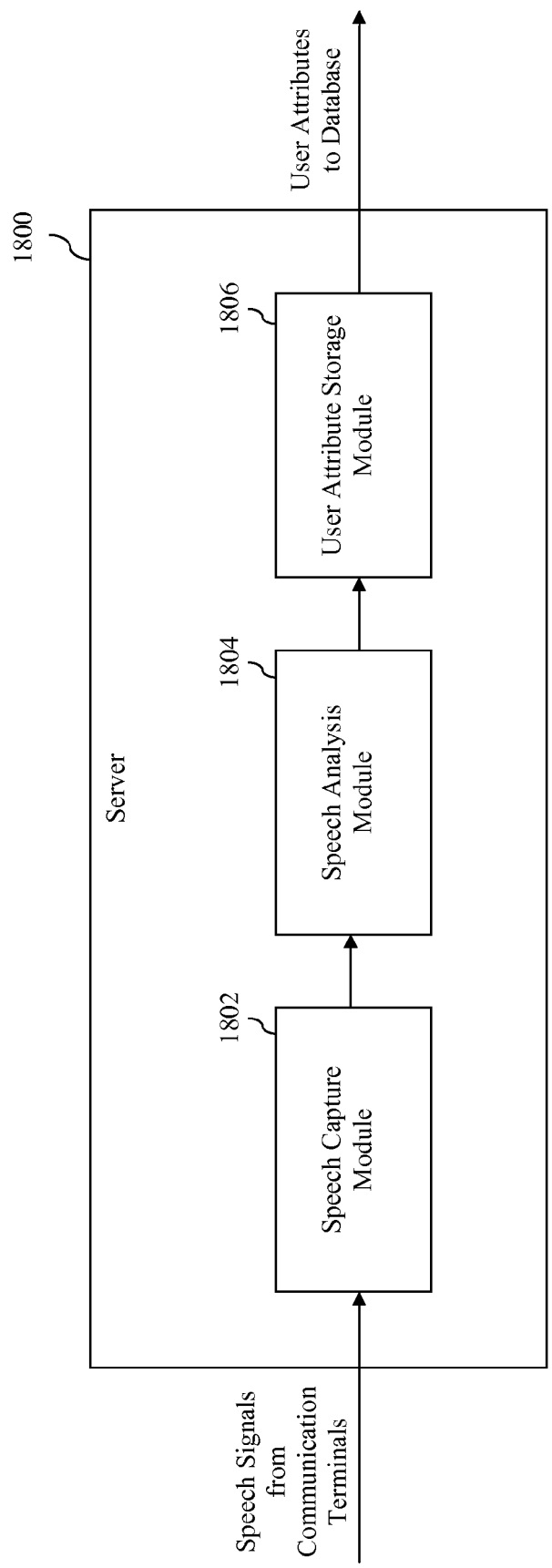
FIG. 18 is a block diagram of a server that generates user attribute information in accordance with an embodiment of the present invention.

In the embodiment described above, the user attribute information associated with a user is generated by components operating on a communication terminal that is owned or otherwise utilized by the user. In an alternate embodiment, the user attribute information associated with a user is generated by a server operating within a network to which a communication terminal operated by the user is communicatively connected. A block diagram of an example server in accordance with such an embodiment is shown in FIG. 18. In particular, FIG. 18 is a block diagram of a server 1800 that includes a speech capture module 1802, a speech analysis module 1804 and a user attribute storage module 1806.

Speech capture module 1802 comprises a component that operates to capture speech signals associated with various users that are transmitted by a plurality of different communication terminals over a network. Speech capture module 1602 may capture the speech signals associated with the various users when the users are conducting communication sessions on their communication terminals. Speech capture module 1802 may capture such speech signals in an encoded form.

Speech analysis module 1804 comprises a component that processes the speech signals captured by speech capture module 1802 to generate user attribute information and/or to update existing user attribute information for each of a plurality of different users. As noted above, such user attribute information may comprise any speaker-dependent characteristics associated with a user of a communication terminal that relate to a model used by a configurable speech codec for coding speech. In an embodiment in which the speech signals captured by speech capture module 1802 are encoded speech signals, speech analysis module 1804 may first decode the encoded speech signals prior to processing. In an alternate embodiment, speech analysis module 1804 operates directly on encoded speech signals. The user attribute information generated and/or updated by speech analysis module 1804 is stored at least temporarily in memory on server 1800.

User attribute storage module 1806 comprises a component that makes the user attribute information generated or updated by speech analysis module 1804 available to various communication terminals for use in configuring a configurable speech codec of each of the various communication terminals to operate in a speaker-dependent manner. In one embodiment, user attribute storage module 1806 performs this task by storing user attribute information associated with a plurality of different users in a user attribute database to which server 1800 is communicatively connected. In an alternate embodiment, user attribute storage module 1806 performs this task by transmitting the user attribute information associated with a plurality of different users to another server and the other server stores the user attribute information in a user attribute database.

Figure 19:
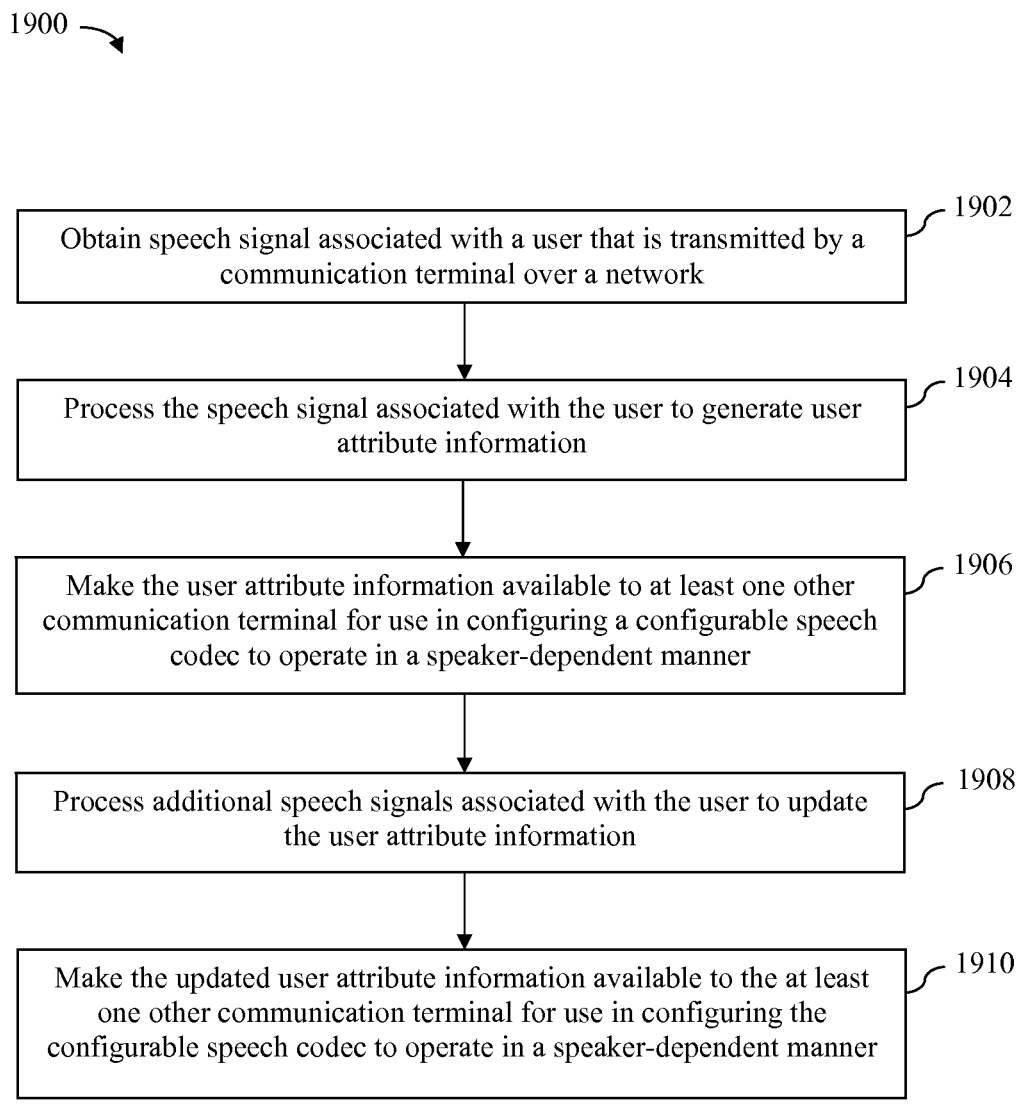
FIG. 19 depicts a flowchart of a method performed by a server for generating and sharing user attribute information in accordance with an embodiment of the present invention.

FIG. 19 depicts a flowchart 1900 of a method performed by a server for generating and sharing user attribute information in accordance with an embodiment of the present invention. For the purposes of illustration only, the method of flowchart 1900 will now be described in reference to components of communication terminal 1800 of FIG. 8. However, persons skilled in the relevant art(s) will readily appreciate that the method of flowchart 1900 may be performed by other components and/or communication terminals.

As shown in FIG. 19, the method of flowchart 1900 begins at step 1902 in which speech capture module 1802 obtains a speech signal associated with a user that is transmitted by a communication terminal over a network. As noted above, the speech signal may be obtained when the user is using a communication terminal to conduct a communication session. As also noted above, the speech signal may be in an encoded form.

At step 1904, speech analysis module 1804 processes the speech signal associated with the user to generate user attribute information associated with the user, which is stored at least temporarily in local memory on server 1800. The user attribute information may comprise any speaker-dependent characteristics associated with the user that relate to a model used by a configurable speech codec for coding speech. For example, where the configurable speech codec is a configurable analysis-by-synthesis speech codec, the user attribute information may comprise information associated with at least one of a vocal tract of the user, a pitch or pitch range of the user, and an excitation signal (including excitation shape and/or gain) associated with the user. As a further example, where the configurable speech codec is a configurable speech codec that separately encodes/decodes speaker-independent and speaker-dependent components of a speech signal, the user attribute information may comprise information useful to transform a linguistic symbolic representation of speech content into spoken speech. Such information may include for example, information relating to a pitch of the user (e.g., accent shape, average pitch, contour slope, final lowering, pitch range and reference line), information relating to a timing of the user (e.g., exaggeration, fluent pauses, hesitation pauses, speech rate and stress frequency), information relating to a voice quality of the user (e.g., breathiness, brilliance, laryngealization, loudness, pause discontinuity, pitch discontinuity, tremor) and information relating to an articulation of the user (e.g., precision). However, these are merely examples, and various other types of user attribute information may be generated during step 1904.

At step 1906, user attribute storage module 1806 makes the user attribute information available to at least one other communication terminal for use in configuring a configurable speech codec to operate in a speaker-dependent manner. As noted above, this step may comprise, for example, storing the user attribute information in a user attribute database for subsequent transmission to the at least one other communication terminal or transmitting the user attribute information to a different server that stores the user attribute information in a user attribute database for subsequent transmission to the at least one other communication terminal.

At step 1908, speech analysis module 1804 processes additional speech signals associated with the user that are obtained by speech capture module 1802 to update the user attribute information associated with the user. Such updating may be performed, for example, to improve or refine the quality of the user attribute information over time and/or to adapt to changes in the voice of the user. At step 1810, user attribute storage module 1806 makes the updated user attribute information available to the at least one other communication terminal for use in configuring the configurable speech codec to operate in a speaker-dependent manner.

The frequency at which the user attribute information is updated and made available to other communication terminals may vary depending upon the implementation. For example, in one embodiment, additional speech signals associated with the user are processed by speech analysis module 1804 to update the user attribute information associated with the user each time the user uses a network-connected communication terminal to conduct a communication session. In another embodiment, the additional speech signals associated with the user are processed by speech analysis module 1804 to update the user attribute information associated with the user on a periodic basis. For example, the additional speech signals associated with the user may be processed by speech analysis module 1804 to update the user attribute information associated with the user every time a predetermined interval of time has passed or after a predetermined number of communication sessions have been conducted. Making updated user attribute information available may comprise making an entirely new set of user attribute information available or making available information representing differences between updated user attribute information and previously-generated and/or distributed user attribute information. The differences made available may comprise only the absolute value of those attributes that have changed or delta values that represent the difference between updated attribute values and previously-generated and/or distributed attribute values.

In certain embodiments, speech analysis module 1804 processes additional speech signals associated with the user that are obtained by speech capture module 1802 to determine whether locally-stored user attribute information for the user is up-to-date. If the locally-stored user attribute information is deemed up-to-date, then speech analysis module 1804 will not generate updated user attribute information. However, if the locally-stored user attribute information is deemed out-of-date, then speech analysis module 1804 will generate updated user attribute information. In one implementation, speech analysis module 1804 periodically updates a locally-stored copy of the user attribute information for a user but does not make the updated locally-stored copy of the user attribute information available until it is determined that a measure of differences between the updated locally-stored copy of the user attribute information and a copy of the user attribute information that was previously made available exceeds some threshold.

In the embodiments described above in reference to FIGS. 18 and 19 in which a server generates user attribute information for multiple different users, it may be necessary to first identify a user prior to generating or updating the user attribute information associated therewith. For the embodiments described in reference to FIGS. 16 and 17, such identification may also be necessary if multiple users can use the same communication terminal. To address this issue, any of a variety of methods for identifying a user of a communication terminal can be used, including any of the previously-described speech-related and non-speech-related methods for identifying a user of a communication terminal.

In an embodiment in which user attributes are centrally stored on a communications network (e.g., communications system 900 of FIG. 9, in which user attributes are stored in user attributes database 910 and managed by application server 908), various methods may be used to transfer the user attributes to the communication terminals. Additionally, in an embodiment in which user attributes are generated and updated by the communication terminals and then transmitted to a network entity, various methods may be used to transfer the generated/updated user attributes from the communication terminals to the network entity.

Figure 20:
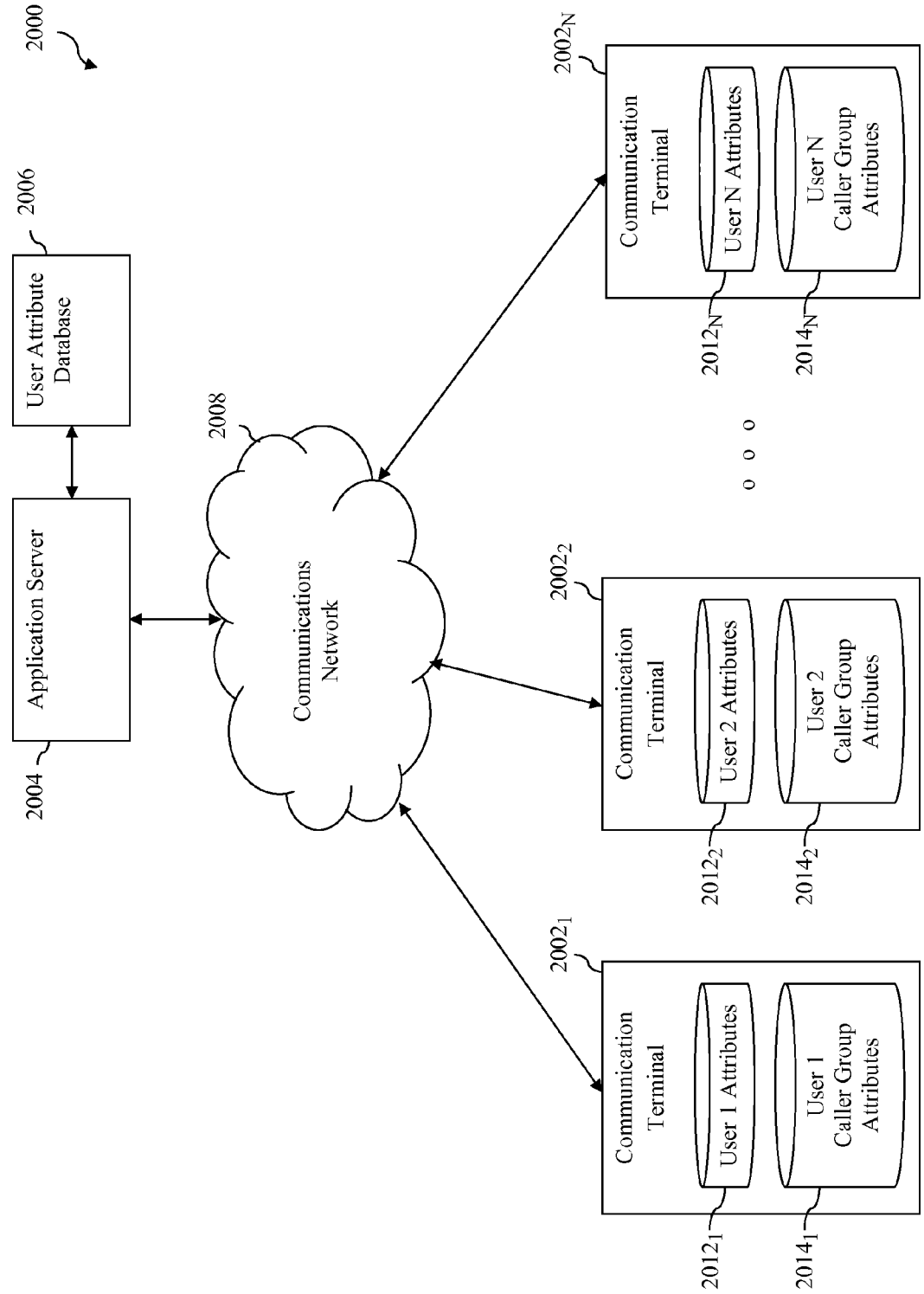
FIG. 20 is a block diagram of a communications system in accordance with an embodiment of the present invention in which user attributes are stored on a communications network and selectively transferred to a plurality of communication terminals.

By way of example, FIG. 20 depicts a block diagram of a communications system 2000 in which user attribute information is stored on a communications network and selectively transferred to a plurality of communication terminals $2002_1$-$2002_N$ for storage and subsequent use by each communication terminal in configuring a configurable speech codec to operate in a speaker dependent manner. In communications system 2000, a plurality of sets of user attributes respectively associated with a plurality of users of communications system 2000 are stored in a user attribute database 2006 which is managed by an application server 2004. Application server 2004 is also connected to the plurality of communication terminals $2002_1$-$2002_N$ via a communications network 2008 and operates to selectively distribute certain sets of user attributes associated with certain users to each of communication terminals $2002_1$-$2002_N$.

In the embodiment shown in FIG. 20, application server 2004 periodically "pushes" selected sets of user attributes, and user attribute updates, to each communication terminal $2002_1$-$2002_N$, and each communication terminal stores the received sets of user attributes in local memory for subsequent use in performing speaker-dependent speech coding. In certain embodiments, application server 2004 ensures that the sets of user attributes and updates are transmitted to the communication terminals at times of reduced usage of communications network 2008, such as certain known off-peak time periods associated with communications network 2008. Furthermore, the sets of user attributes may be transferred to a communication terminal when the terminal is powered on but idle (e.g., not conducting a communication session). This "push" based approach thus differs from a previously-described approach in which a set of user attributes associated with a user involved in a communication session is transmitted to a communication terminal during communication session set-up. By pushing user attributes to the communication terminals during off-peak times when the terminals are idle, the set-up associated with subsequent communication sessions can be handled more efficiently.

It is likely impossible and/or undesirable to store every set of user attributes associated with every user of communications network 2008 on a particular communication terminal. Therefore, in an embodiment, application server 2004 sends only selected sets of user attributes to each communication terminal. The selected sets of user attributes may represent sets associated with users that are deemed the most likely to call or be called by the communication terminal. Each communication terminal stores its selected sets of user attributes for subsequent use in performing speaker-dependent speech coding during communication sessions with the selected users. In communications system 2000, the selected sets of user attributes that are pushed to and stored by each communication terminal $2002_1$-$2002_N$ are represented as user 1 caller group attributes $2014_1$, user 2 caller group attributes $2014_2$, . . . , user N caller group attributes $2014_N$.

During a set-up process associated with establishing a communication session, each communication terminal $2002_1$-$2002_N$ will operate to determine whether it has a set of user attributes associated with a far-end participant in the communication session stored within its respective caller group attributes $2014_1$-$2014_N$. If the communication terminal has the set of user attributes associated with the far-end participant stored within its respective caller group attributes, then the communication terminal will use the set of user attributes in a manner previously described to configure a speech codec to operate in a speaker-dependent manner. If the communication terminal does not have the set of user attributes associated with the far-end participant stored within its respective caller group attributes, then the communication terminal must fetch the set of user attributes from application server 2004 as part of the set-up process. The communication terminal then uses the fetched set of user attributes in a manner previously described to configure a speech codec to operate in a speaker-dependent manner.

In the embodiment shown in FIG. 20, each communication terminal $2002_1$-$2002_N$ operates to generate and update a set of user attributes associated with a user thereof. At least one example of a communication terminal that is capable of generating and updating a set of user attributes associated with a user thereof was previously described. The set of user attributes generated and updated by each communication terminal $2002_1$-$2002_N$ is represented as user 1 attributes $2012_1$, user 2 attributes $2012_2$, . . . , user N attribute $2012_N$.

In accordance with one implementation, each communication terminal $2002_1$-$2002_N$ is responsible for transmitting its respective set of user attributes $2012_1$-$2012_N$ to application server 2004 for storage in user attribute database. For example, each communication terminal $2002_1$-$2002_N$ may be configured to periodically transmit its respective set of user attributes $2012_1$-$2012_N$ to application server 2004. Such periodic transmission may occur after each communication session, after a predetermined time period, during periods in which the communication terminal is idle, and/or during time periods identified in a schedule distributed by application server 2004.

In accordance with another implementation, application server 2004 is responsible for retrieving a set of user attributes $2012_1$-$2012_N$ from each respective communication terminal $2002_1$-$2002_N$. For example, application server 2004 may perform such retrieval by initiating a request-response protocol with each communication terminal $2002_1$-$2002_N$. Application server may be configured to retrieve the set of user attributes $2012_1$-$2012_N$ from each respective communication terminal $2002_1$-$2002_N$ on a periodic basis. For example, application server 2004 may be configured to retrieve the set of user attributes $2012_1$-$2012_N$ from each respective communication terminal $2002_1$-$2002_N$ after a communication session has been carried out by each communication terminal, after a predetermined time period, during periods in which each communication terminal is idle, and/or during time periods of reduced usage of communications network 2008, such as certain known off-peak time periods associated with communications network 2008.

Figure 21:
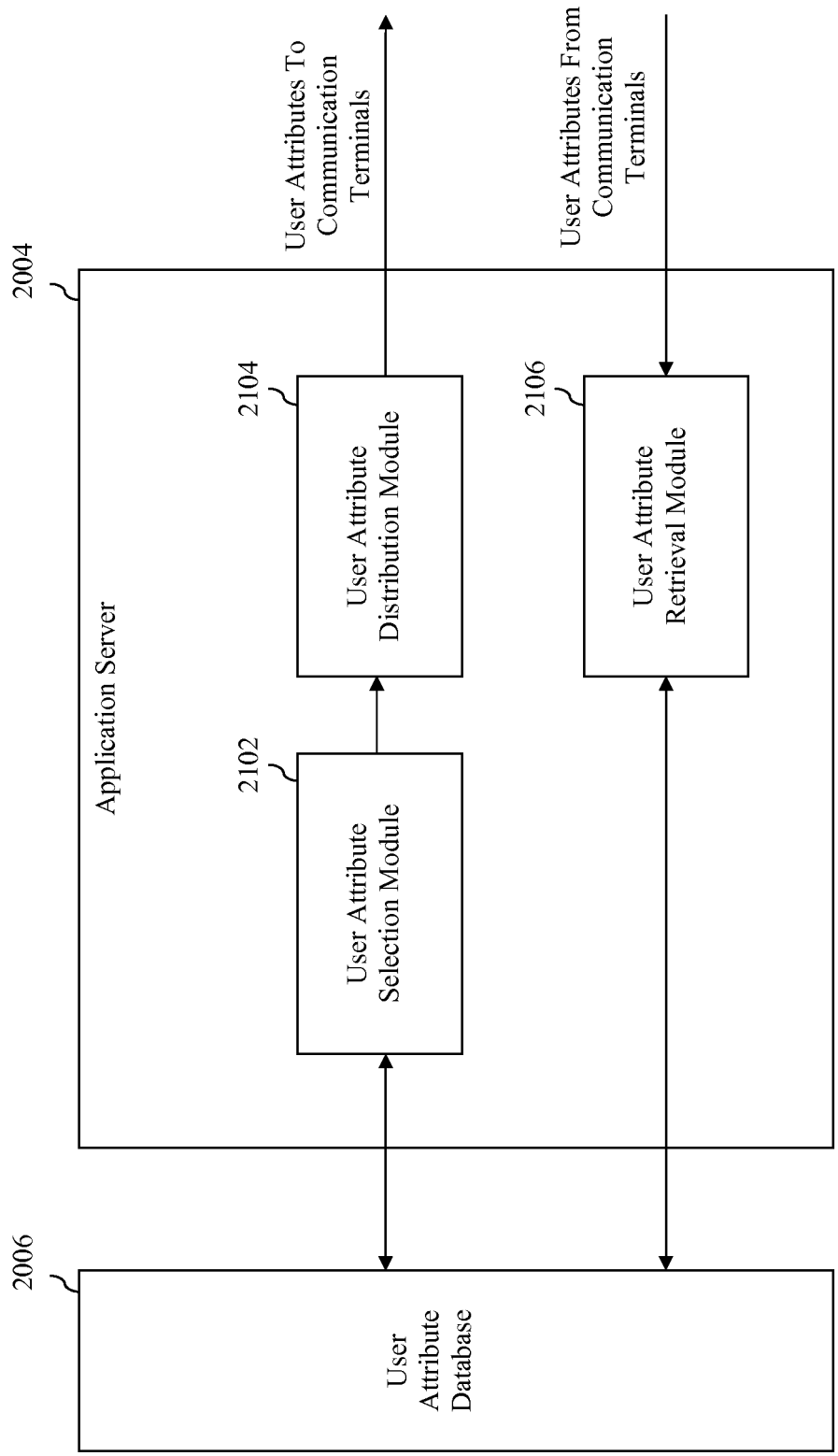
FIG. 21 is a block diagram that shows a particular implementation of an application server of the communications system of FIG. 20 in accordance with one embodiment of the present invention.

FIG. 21 is a block diagram that shows a particular implementation of application server 2004 in accordance with one embodiment. As shown in FIG. 21, application server 2004 includes a user attribute selection module 2112, a user attribute distribution module and a user attribute retrieval module 2116.

User attribute selection module 2102 is configured to select one or more sets of user attributes from among the plurality of sets of user attributes stored in user attribute database 2006 for subsequent transmission to a communication terminal. In an embodiment, user attribute selection module 2102 is configured to select sets of user attributes for transmission to a communication terminal that are associated with users that are deemed the most likely to call or be called by the communication terminal. User attribute selection module 2102 may utilize various methods to identify the users that are deemed most likely to call or be called by the communication terminal. For example, user attribute selection module 2102 may identify a group of users that includes the most frequently called and/or the most frequently calling users with respect to the communication terminal. As another example, user attribute selection module 2102 may identify a group of users that includes the most recently called and/or the most recently calling users with respect to the communication terminal. As a still further example, user attribute selection module 2102 may identify a group of users that have been previously selected by a user of the communication terminal (e.g., users identified by a participant during enrollment in a calling plan). As yet another example, user attribute selection module 2102 may identify a group of users that includes users represented in an address book, contact list, or other user database associated with the communication terminal. In certain implementations, the identification of the users that are deemed most likely to call or be called by the communication terminal may be performed by a different network entity than application server 2004 and a list of the identified users may be transmitted to application server 2004 for use by user attribute selection module 2102 in selecting sets of user attributes.

User attribute distribution module 2104 is configured to transmit the set(s) of user attributes selected by user attribute selection module 2102 for a communication terminal to the communication terminal via communications network 2008. The communication terminal stores and uses the set(s) of user attributes transmitted thereto for configuring a configurable speech codec of the communication terminal to operate in a speaker-dependent manner. In one embodiment, user attribute distribution module 2104 is configured to transmit the set(s) of user attributes to the communication terminal during a period of reduced usage of communications network 2008, such as certain known off-peak time periods associated with communications network 2008.

User attribute retrieval module 2106 is configured to retrieve one or more sets of user attributes from a communication terminal that is configured to generate such set(s) of user attributes. At least one example of a communication terminal that is capable of generating and updating a set of user attributes associated with a user thereof was previously described. User attribute retrieval module 2106 may be configured to retrieve the set of user attributes from the communication terminal on a periodic basis. For example, user attribute retrieval module 2106 may be configured to retrieve the set of user attributes from the communication terminal after a communication session has been carried out by the communication terminal, after a predetermined time period, during periods in which the communication terminal is idle, and/or during time periods of reduced usage of communications network 2008, such as certain known off-peak time periods associated with communications network 2008. User attribute retrieval 2106 may also be configured to retrieve one or more sets of user attribute updates from the communication terminal in a like manner.

Figure 22:
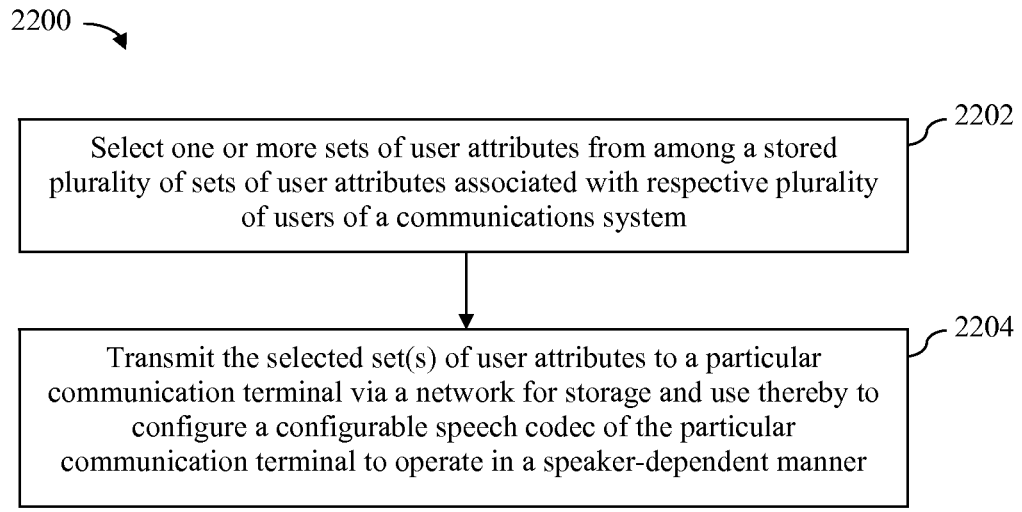
FIG. 22 depicts a flowchart of a method performed by a server for selectively distributing one or more sets of user attributes to a communication terminal in accordance with an embodiment of the present invention.

FIG. 22 depicts a flowchart 2200 of a method performed by a server for selectively distributing one or more sets of user attributes to a communication terminal in accordance with an embodiment of the present invention. For the purposes of illustration only, the method of flowchart 2200 will now be described in reference to components of example application server 2004 as depicted in FIG. 21. However, persons skilled in the relevant art(s) will readily appreciate that the method of flowchart 2200 may be performed by other components, other servers, and/or by network-connected entities other than servers.

As shown in FIG. 22, the method of flowchart 2200 begins at step 2202, in which user attribute selection module 2102 of application server 2004 selects one or more sets of user attributes from among a plurality of sets of user attributes associated a respective plurality of users of communication system 2000 stored in user attributed database 2006. In one embodiment, selecting the set(s) of user attributes comprises selecting one or more sets of user attributes corresponding to one or more frequently-called or frequently-calling users identified for the particular communication terminal. In an alternate embodiment, selecting the set(s) of user attributes comprises selecting one or more sets of user attributes corresponding to one or more recently-called or recently-calling users identified for the communication terminal. In a further embodiment, selecting the set(s) of user attributes comprises selecting one or more sets of user attributes corresponding to one or more users identified in a user database associated with the particular communication terminal. The user database may comprise, for example, an address book, contact list, or the like. In a still further embodiment, selecting the set(s) of user attributes comprises selecting sets of user attributes corresponding to a selected group of users identified by a user associated with the particular communication terminal.

At step 2204, user attribute distribution module 2104 transmits the selected set(s) of user attributes to a particular communication terminal via a network for storage and use thereby to configure a configurable speech codec of the particular communication terminal to operate in a speaker-dependent manner. In an embodiment, transmitting the selected set(s) of user attributes to the particular communication terminal comprises transmitting the selected set(s) of user attributes to the particular communication terminal during a period of reduced network usage.

Figure 23:
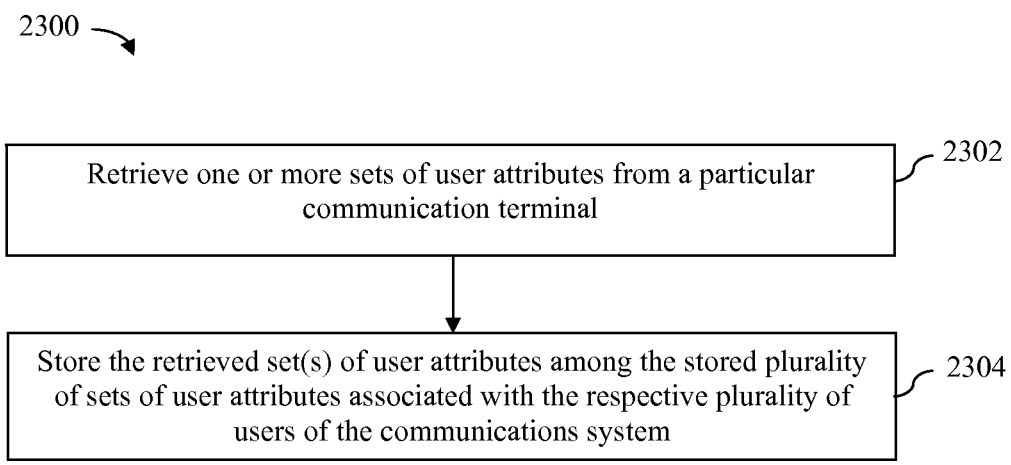
FIG. 23 depicts a flowchart of a method performed by a server for retrieving one or more sets of user attributes from a communication terminal in accordance with an embodiment of the present invention.

FIG. 23 depicts a flowchart 2300 of a method performed by a server for retrieving one or more sets of user attributes from a communication terminal in accordance with an embodiment of the present invention. For the purposes of illustration only, the method of flowchart 2300 will now be described in reference to components of example application server 2004 as depicted in FIG. 21. However, persons skilled in the relevant art(s) will readily appreciate that the method of flowchart 2300 may be performed by other components, other servers, and/or by network-connected entities other than servers.

As shown in FIG. 23, the method of flowchart 2300 begins at step 2302, in which user attribute retrieval module 2106 of application server 2004 retrieves one or more sets of user attributes from a particular communication terminal. Retrieving the set(s) of user attributes from the particular communication terminal may comprise retrieving the set(s) of user attributes from the particular communication terminal on a periodic basis. For example, retrieving the set(s) of user attributes from the particular communication terminal may comprise retrieving the set(s) of user attributes from the particular communication terminal after a communication session has been carried out by the particular communication terminal, after a predetermined time period, during periods in which the particular communication terminal is idle, and/or during time periods of reduced usage of communications network 2008, such as certain known off-peak time periods associated with communications network 2008. User attribute retrieval 2106 may also be configured to retrieve one or more sets of user attribute updates from the communication terminal in a like manner.

Persons skilled in the relevant art(s) will readily appreciate that a method similar to that described above in reference to flowchart 2300 of FIG. 23 may also be used to retrieve updates to one or more sets of user attributes from a particular communication terminal.

In certain embodiments, sets of user attributes may be transferred to or obtained by a communication terminal over a plurality of different channels or networks. For example, in one embodiment, sets of user attributes may be transferred to a communication terminal over a mobile telecommunications network, such as a 3G cellular network, and also over an IEEE 802.11 compliant wireless local area network (WLAN). Depending upon how the sets of user attributes are distributed, a network entity or the communication terminal itself may determine which mode of transfer is the most efficient and then transfer or obtain the sets of user attributes accordingly.

H. Example Computer System Implementation

It will be apparent to persons skilled in the relevant art(s) that various elements and features of the present invention, as described herein, may be implemented in hardware using analog and/or digital circuits, in software, through the execution of instructions by one or more general purpose or special-purpose processors, or as a combination of hardware and software.

Figure 24:
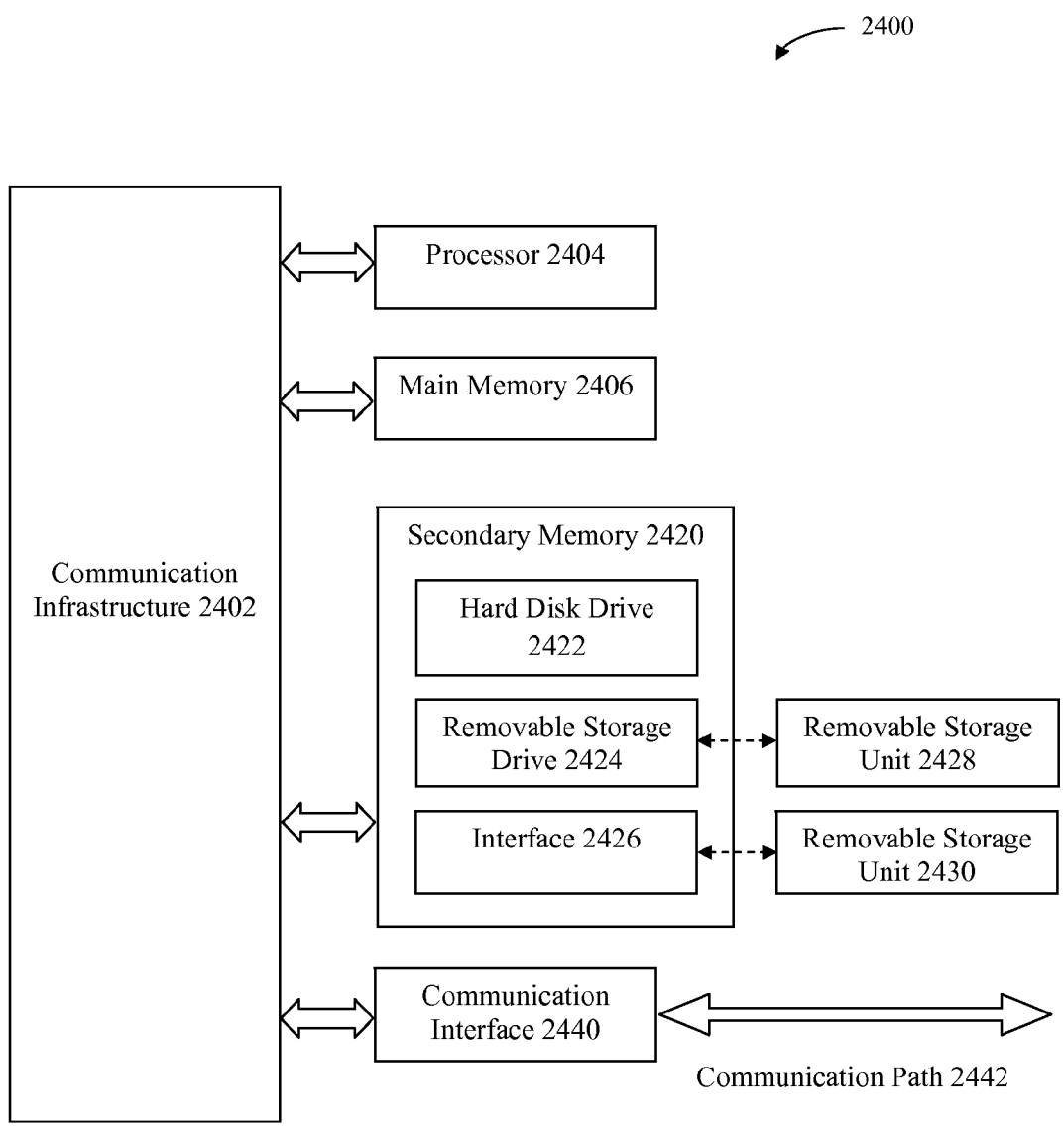
FIG. 24 is a block diagram of an example computer system that may be used to implement aspects of the present invention.

The following description of a general purpose computer system is provided for the sake of completeness. Embodiments of the present invention can be implemented in hardware, or as a combination of software and hardware. Consequently, embodiments of the invention may be implemented in the environment of a computer system or other processing system. An example of such a computer system 2400 is shown in FIG. 24. All of the modules and logic blocks depicted in FIGS. 2-4, 6-9, 11-13, 15, 16, 18, 20 and 21 for example, can execute on one or more distinct computer systems 2400. Furthermore, all of the steps of the flowcharts depicted in FIGS. 10, 14, 17, 19, 22 and 23 can be implemented on one or more distinct computer systems 2400.

Computer system 2400 includes one or more processors, such as processor 2404. Processor 2404 can be a special purpose or a general purpose digital signal processor. Processor 2404 is connected to a communication infrastructure 2402 (for example, a bus or network). Various software implementations are described in terms of this exemplary computer system. After reading this description, it will become apparent to a person skilled in the relevant art(s) how to implement the invention using other computer systems and/or computer architectures.

Computer system 2400 also includes a main memory 2406, preferably random access memory (RAM), and may also include a secondary memory 2420. Secondary memory 2420 may include, for example, a hard disk drive 2422 and/or a removable storage drive 2424, representing a floppy disk drive, a magnetic tape drive, an optical disk drive, or the like. Removable storage drive 2424 reads from and/or writes to a removable storage unit 2428 in a well known manner. Removable storage unit 2428 represents a floppy disk, magnetic tape, optical disk, or the like, which is read by and written to by removable storage drive 2424. As will be appreciated by persons skilled in the relevant art(s), removable storage unit 2428 includes a computer usable storage medium having stored therein computer software and/or data.

In alternative implementations, secondary memory 2420 may include other similar means for allowing computer programs or other instructions to be loaded into computer system 2400. Such means may include, for example, a removable storage unit 2430 and an interface 2426. Examples of such means may include a program cartridge and cartridge interface (such as that found in video game devices), a removable memory chip (such as an EPROM, or PROM) and associated socket, a flash drive and USB port, and other removable storage units 2430 and interfaces 2426 which allow software and data to be transferred from removable storage unit 2430 to computer system 2400.

Computer system 2400 may also include a communications interface 2440. Communications interface 2440 allows software and data to be transferred between computer system 2400 and external devices. Examples of communications interface 2440 may include a modem, a network interface (such as an Ethernet card), a communications port, a PCM-CIA slot and card, etc. Software and data transferred via communications interface 2440 are in the form of signals which may be electronic, electromagnetic, optical, or other signals capable of being received by communications interface 2440. These signals are provided to communications interface 2440 via a communications path 2442. Communications path 2442 carries signals and may be implemented using wire or cable, fiber optics, a phone line, a cellular phone link, an RF link and other communications channels.

As used herein, the terms "computer program medium" and "computer readable medium" are used to generally refer to tangible, non-transitory storage media such as removable storage units 2428 and 2430 or a hard disk installed in hard disk drive 2422. These computer program products are means for providing software to computer system 2400.

Computer programs (also called computer control logic) are stored in main memory 2406 and/or secondary memory 2420. Computer programs may also be received via communications interface 2440. Such computer programs, when executed, enable the computer system 2400 to implement the present invention as discussed herein. In particular, the computer programs, when executed, enable processor 2404 to implement the processes of the present invention, such as any of the methods described herein. Accordingly, such computer programs represent controllers of the computer system 2400. Where the invention is implemented using software, the software may be stored in a computer program product and loaded into computer system 2400 using removable storage drive 2424, interface 2426, or communications interface 2440.

In another embodiment, features of the invention are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

I. Conclusion

While various embodiments of the present invention have been described above, it should be understood that they have been presented by way of example only, and not limitation. It will be understood by those skilled in the relevant art(s) that various changes in form and details may be made to the embodiments of the present invention described herein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A communication terminal, comprising:
a speech capture module that obtains a speech signal associated with a user;
a speech analysis module that processes the speech signal associated with the user to generate user attribute information;
a network interface module that transmits the user attribute information to a network for the purpose of making the user attribute information available to at least one other communication terminal for use in configuring a configurable speech codec of the at least one other communication terminal to operate in a speaker-dependent manner;
decomposition logic configured to decompose the speech signal into a speaker-independent signal and a speaker-dependent signal;
a first encoder configured to encode the speaker-independent signal without using the user attribute information and provide the encoded speaker-independent signal for transmission to the at least one other communication terminal; and
a second encoder configured to encode the speaker dependent signal using the user attribute information and provide the encoded speaker-dependent signal for transmission to the at least one other communication terminal.

2. The communication terminal of claim 1, wherein the speech capture module obtains the speech signal associated with the user when the user is using the communication terminal to conduct a communication session.

3. The communication terminal of claim 1, wherein the speech capture module obtains the speech signal associated with the user when the communication terminal is operating in a training mode.

4. The communication terminal of claim 1, wherein the speech analysis module processes the speech signal associated with the user to generate user attribute information that includes information associated with at least one of:
a vocal tract of the user;
a pitch or pitch range of the user; and
an excitation signal associated with the user.

5. The communication terminal of claim 1, wherein the speech analysis module processes the speech signal associated with the user to generate user attribute information that includes information associated with at least one of:
a pitch of the user;
a timing of the user;
a voice quality of the user; and
an articulation of the user.

6. The communication terminal of claim 1, wherein the network interface module transmits the user attribute information via the network to a server that stores the user attribute information for subsequent transmission to the at least one other communication terminal.

7. The communication terminal of claim 1, wherein the network interface module transmits the user attribute information via the network to the at least one other communication terminal.

8. The communication terminal of claim 1, wherein the speech analysis module is further configured to process additional speech signals associated with the user to update the user attribute information and wherein the network interface module transmits the updated user attribute information to the network.

9. The communication terminal of claim 8, wherein the speech analysis module is configured to process the additional speech signals associated with the user to update the user attribute information each time the user uses the communication terminal to conduct a communication session.

10. The communication terminal of claim 8, wherein the speech analysis module is configured to process the additional speech signals associated with the user to update the user attribute information periodically based on a predetermined time interval or number of communication sessions.

11. The communication terminal of claim 8, wherein the network interface module transmits the updated user attribute information to the network by transmitting only differences between the updated user attribute information and previously-transmitted user attribute information.

12. The communication terminal of claim 8, wherein the network interface module transmits the updated user attribute information to the network only if a measure of difference between the updated user attribute information and previously-transmitted user attribute information exceeds a threshold.

13. A method performed by a communication terminal, comprising:
obtaining a speech signal associated with a user;
processing the speech signal associated with the user to generate user attribute information;
transmitting the user attribute information to a network for the purpose of making the user attribute information available to at least one other communication terminal for use in configuring a configurable speech codec of the at least one other communication terminal to operate in a speaker-dependent manner;
decomposing the speech signal into a speaker-independent signal and a speaker-dependent signal;
encoding, by a first encoder, the speaker-independent signal without using the user attribute information and providing the encoded speaker-independent signal to the at least one other communication terminal; and
encoding, by a second encoder, the speaker dependent signal using the user attribute information and providing the encoded speaker-dependent signal to the at least one other communication terminal.

14. The method of claim 13, wherein obtaining the speech signal associated with the user comprises obtaining the speech signal associated with the user when the user is using the communication terminal to conduct a communication session.

15. The method of claim 13, wherein obtaining the speech signal associated with the user comprises obtaining the speech signal associated with the user when the communication terminal is operating in a training mode.

16. The method of claim 13, wherein processing the speech signal associated with the user to generate the user attribute information comprises processing the speech signal associated with the user to generate information associated with at least one of:
a vocal tract of the user;
a pitch or pitch range of the user; and
an excitation signal associated with the user.

17. The method of claim 13, wherein processing the speech signal associated with the user to generate the user attribute information comprises processing the speech signal associated with the user to generate information associated with at least one of:
- a pitch of the user;
- a timing of the user;
- a voice quality of the user; and
- an articulation of the user.

18. The method of claim 13, wherein transmitting the user attribute information via the network comprises transmitting the user attribute information via the network to a server that stores the user attribute information for subsequent transmission to the at least one other communication terminal.

19. The method of claim 13, wherein transmitting the user attribute information via the network comprises transmitting the user attribute information via the network to the at least one other communication terminal.

20. The method of claim 13, further comprising:
processing additional speech signals associated with the user to update the user attribute information; and
transmitting the updated user attribute information to the network.

21. The method of claim 20, wherein processing the additional speech signals associated with the user to update the user attribute information comprises:
processing the additional speech signals associated with the user to update the user attribute information each time the user uses the communication terminal to conduct a communication session.

22. The method of claim 20, wherein processing the additional speech signals associated with the user to update the user attribute information comprises:
processing the additional speech signals associated with the user to update the user attribute information periodically based on a predetermined time interval or number of communication sessions.

23. The method of claim 20, wherein transmitting the updated user attribute information to the network comprises transmitting only differences between the updated user attribute information and previously-transmitted user attribute information.

24. The method of claim 20, wherein transmitting the updated user attribute information to the network comprises transmitting the updated user attribute information to the network only if a measure of difference between the updated user attribute information and previously-transmitted user attribute information exceeds a threshold.

25. A server, comprising:
a speech capture module that obtains a speech signal associated with a user that is transmitted by a communication terminal over a network;
a speech analysis module that processes the speech signal associated with the user to generate user attribute information; and
a user attribute storage module that makes the user attribute information available to at least one other communication terminal that connects to the network for use in configuring a configurable speech codec of the at least one other communication terminal to operate in a speaker-dependent manner and makes the user attribute information available to the communication terminal for use in encoding the speech signal using the user attribute information for transmission to the at least one other communication terminal, wherein configuring the configurable speech codec of the at least one other communication terminal to operate in the speaker-dependent manner comprises decoding, by a first decoder of the at least one other communication terminal, a speaker-independent signal without using the user attribute information and decoding, by a second decoder of the at least one other communication terminal, speaker-dependent signal using the user attribute information.

26. The server of claim 25, wherein the speech analysis module processes the speech signal associated with the user to generate user attribute information that includes information associated with at least one of:
- a vocal tract of the user;
- a pitch or pitch range of the user; and
- an excitation signal associated with the user.

27. The server of claim 25, wherein the speech analysis module processes the speech signal associated with the user to generate user attribute information that includes information associated with at least one of:
- a pitch of the user;
- a timing of the user;
- a voice quality of the user; and
- an articulation of the user.

28. The server of claim 25, wherein the user attribute storage module makes the user attribute information available to the at least one other communication terminal by storing the user attribute information for subsequent transmission to the at least one other communication terminal.

29. The server of claim 25, wherein the user attribute storage module makes the user attribute information available to the at least one other communication terminal by transmitting the user attribute information to another server that stores the user attribute information for subsequent transmission to the at least one other communication terminal.

30. The server of claim 25, wherein the speech analysis module is further configured to process additional speech signals associated with the user to update the user attribute information and wherein the user attribute distribution modules makes the updated user attribute information available to the at least one other communication terminal.

31. The server of claim 30, wherein the speech analysis module is configured to process the additional speech signals associated with the user to update the user attribute information each time the user uses a communication terminal to conduct a communication session.

32. The server of claim 30, wherein the speech analysis module is configured to process the additional speech signals associated with the user to update the user attribute information periodically based on a predetermined time interval or number of communication sessions.

33. The server of claim 30, wherein the user attribute distribution module makes the updated user attribute information available to the at least one other communication terminal by making available only differences between the updated user attribute information and user attribute information that was previously made available.

34. The server of claim 30, wherein the user attribute distribution module makes the updated user attribute information available only if a measure of difference between the updated user attribute information and user attribute information that was previously made available exceeds a threshold.

35. A method implemented by a server, comprising:
obtaining a speech signal associated with a user that is transmitted by a communication terminal over a network;
processing the speech signal associated with the user to generate user attribute information;
making the user attribute information available to at least one other communication terminal that connects to the network for use in configuring a configurable speech codec of the at least one other communication terminal to operate in a speaker-dependent manner, wherein configuring the configurable speech codec of the at least one other communication terminal to operate in the speaker-dependent manner comprises decoding, by a first decoder of the at least one other communication terminal, a speaker-independent signal without using the user attribute information and decoding, by a second decoder of the at least one other communication terminal, speaker-dependent signal using the user attribute information; and providing the user attribute information to the communication terminal for use in encoding the speech signal using the user attribute information for transmission to the at least one other communication terminal.

36. The method of claim 35, wherein processing the speech signal associated with the user to generate the user attribute information comprises processing the speech signal associated with the user to generate information associated with at least one of:
 a vocal tract of the user;
 a pitch or pitch range of the user; and
 an excitation signal associated with the user.

37. The method of claim 35, wherein processing the speech signal associated with the user to generate the user attribute information comprises processing the speech signal associated with the user to generate information associated with at least one of:
 a pitch of the user;
 a timing of the user;
 a voice quality of the user; and
 an articulation of the user.

38. The method of claim 35, wherein making the user attribute information available to the at least one other communication terminal comprises storing the user attribute information for subsequent transmission to the at least one other communication terminal.

39. The method of claim 35, wherein making the user attribute information available to the at least one other communication terminal comprises transmitting the user attribute information to another server that stores the user attribute information for subsequent transmission to the at least one other communication terminal.

40. The method of claim 35, further comprising:
 processing additional speech signals associated with the user to update the user attribute information; and
 making the updated user attribute information available to the at least one other communication terminal.

41. The method of claim 40, wherein processing the additional speech signals associated with the user to update the user attribute information comprises:
 processing the additional speech signals associated with the user to update the user attribute information each time the user uses a communication terminal to conduct a communication session.

42. The method of claim 40, wherein the speech analysis module is configured to process the additional speech signals associated with the user to update the user attribute information periodically based on a predetermined time interval or number of communication sessions.

43. The method of claim 40, wherein making the updated user attribute information available to the at least one other communication terminal comprises making available only differences between the updated user attribute information and user attribute information that was previously made available.

44. The method of claim 40, wherein making the updated user attribute information available to the at least one other communication terminal comprises making the updated user attribute information available only if a measure of difference between the updated user attribute information and user attribute information that was previously made available exceeds a threshold.

* * * * *